(12) United States Patent
Megretski et al.

(10) Patent No.: US 11,396,133 B2
(45) Date of Patent: Jul. 26, 2022

(54) TECHNIQUES FOR DIRECTING LIGHT FROM A MOVABLE STAGE IN ADDITIVE FABRICATION AND RELATED SYSTEMS AND METHODS

(71) Applicant: Formlabs, Inc., Somerville, MA (US)

(72) Inventors: Dmitri Megretski, Carlisle, MA (US); Benjamin FrantzDale, Harvard, MA (US); Andrew M. Goldman, Stow, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 16/427,936

(22) Filed: May 31, 2019

(65) Prior Publication Data

US 2019/0366636 A1  Dec. 5, 2019

Related U.S. Application Data

(60) Provisional application No. 62/817,293, filed on Mar. 12, 2019, provisional application No. 62/679,167, filed on Jun. 1, 2018.

(51) Int. Cl.
*B29C 64/255* (2017.01)
*B65D 65/40* (2006.01)
(Continued)

(52) U.S. Cl.
CPC ......... *B29C 64/255* (2017.08); *B29C 64/124* (2017.08); *B29C 64/135* (2017.08); *B29C 64/153* (2017.08); *B29C 64/218* (2017.08); *B29C 64/223* (2017.08); *B29C 64/227* (2017.08); *B29C 64/245* (2017.08); *B29C 64/264* (2017.08); *B29C 64/307* (2017.08);
(Continued)

(58) Field of Classification Search
CPC .................................................... B29C 64/255
See application file for complete search history.

(56) References Cited

U.S. PATENT DOCUMENTS 5,004,311 A * 4/1991 Peppers ............. G02B 27/0031
359/208.1
5,391,072 A  2/1995 Lawton et al.
(Continued)

FOREIGN PATENT DOCUMENTS

CN       1910206 A      2/2007
WO    WO 2005/116089 A1   12/2005
(Continued)

OTHER PUBLICATIONS

International Search and Written Opinion for International Application No. PCT/US18/56288 dated Dec. 11, 2018.
(Continued)

*Primary Examiner* — Alison L Hindenlang
*Assistant Examiner* — Asha A Thomas
(74) *Attorney, Agent, or Firm* — Wolf, Greenfield & Sacks, P.C.

(57) ABSTRACT

Techniques for directing light from a movable stage in an additive fabrication device are provided. According to some aspects, the movable stage may include a parabolic mirror onto which light may be directed at various different incident angles to produce light along different positions along an axis. In some cases, this axis may be perpendicular to a direction of motion of the movable stage.

7 Claims, 19 Drawing Sheets

(51) Int. Cl.

| | | |
|---|---|---|
| *B29C 64/264* | (2017.01) | |
| *B33Y 30/00* | (2015.01) | |
| *B33Y 10/00* | (2015.01) | |
| *B33Y 50/02* | (2015.01) | |
| *B29C 64/124* | (2017.01) | |
| *B29C 64/393* | (2017.01) | |
| *B29C 64/227* | (2017.01) | |
| *G01L 1/12* | (2006.01) | |
| *G01L 5/00* | (2006.01) | |
| *G04F 10/10* | (2006.01) | |
| *B29C 64/245* | (2017.01) | |
| *B29C 64/153* | (2017.01) | |
| *B29C 64/218* | (2017.01) | |
| *B29C 64/307* | (2017.01) | |
| *B29C 64/223* | (2017.01) | |
| *B29C 64/135* | (2017.01) | |
| *B33Y 40/00* | (2020.01) | |

(52) U.S. Cl.
CPC ............ *B29C 64/393* (2017.08); *B33Y 10/00* (2014.12); *B33Y 30/00* (2014.12); *B33Y 50/02* (2014.12); *B65D 65/40* (2013.01); *G01L 1/127* (2013.01); *G01L 5/0047* (2013.01); *G01L 5/0076* (2013.01); *G04F 10/10* (2013.01); *B33Y 40/00* (2014.12)

(56) References Cited

U.S. PATENT DOCUMENTS

| | | | |
|---|---|---|---|
| 8,142,179 B2 | 3/2012 | Kihara et al. | |
| 8,758,663 B2 | 6/2014 | Elsey | |
| 9,079,355 B2 | 7/2015 | El-Siblani et al. | |
| 9,205,601 B2 | 12/2015 | DeSimone et al. | |
| 9,375,881 B2 | 6/2016 | Elsey | |
| 9,802,361 B2 | 10/2017 | Elsey | |
| 2004/0135159 A1 | 7/2004 | Siegel | |
| 2007/0224768 A1* | 9/2007 | Chaplick | B23K 26/127 438/308 |
| 2009/0130449 A1 | 5/2009 | El-Siblani | |
| 2009/0196946 A1* | 8/2009 | Kihara | B33Y 30/00 425/171 |
| 2010/0227068 A1* | 9/2010 | Boot | B29C 64/135 427/346 |
| 2012/0106150 A1 | 5/2012 | Vaes et al. | |
| 2014/0070463 A1 | 3/2014 | Boot et al. | |
| 2015/0001763 A1* | 1/2015 | Elsey | B33Y 30/00 264/313 |
| 2016/0046080 A1 | 2/2016 | Thomas et al. | |
| 2016/0067827 A1* | 3/2016 | Zediker | B23K 26/144 219/76.12 |
| 2016/0107380 A1* | 4/2016 | Smoot | B29C 64/124 264/401 |
| 2017/0197363 A1 | 7/2017 | Franizdale | |
| 2017/0225393 A1* | 8/2017 | Shkolnik | B33Y 10/00 |
| 2017/0246796 A1 | 8/2017 | Bauer et al. | |
| 2017/0246797 A1 | 8/2017 | Lambrecht et al. | |
| 2018/0104895 A1 | 4/2018 | Slaczka et al. | |
| 2018/0126644 A1 | 5/2018 | Slaczka et al. | |
| 2019/0152135 A1 | 5/2019 | Goldman | |
| 2019/0210289 A1 | 7/2019 | FrantzDale et al. | |
| 2019/0283332 A1* | 9/2019 | Brown | B29C 64/20 |

FOREIGN PATENT DOCUMENTS

| | | |
|---|---|---|
| WO | WO 2013/170311 A1 | 11/2013 |
| WO | WO 2016/148341 A1 | 9/2016 |

OTHER PUBLICATIONS

Invitation to Pay Additional Fees for International Application No. PCT/US2019/034807 mailed Jul. 18, 2019.
International Search and Written Opinion for International Application No. PCT/US2019/034807 dated Sep. 30, 2019.
Baker, Membrane Technology and Application. 2nd Edition. John Wiley & Sons, Ltd. The Atrium, Southern Gate, Chichester, West Sussex PO19 8SQ, England. 2004. 545 pages ISBN 0-470-85445-6.
Carvalho, Wrinkling of thin sheets under tension. Thesis to obtain the Master of Science Degree in Aerospace Engineering. Nov. 2015. 103 pages.
U.S. Appl. No. 16/163,403, filed Oct. 18, 2018, Golman.
PCT/US18/056288, Dec. 11, 2018, International Search Report and Written Opinion.
PCT/US2019/034807, Jul. 18, 2019, Invitation to Pay Additional Fees.
PCT/US2019/034807, Sep. 30, 2019, International Search Report and Written Opinion.
International Preliminary Report on Patentability for International Application No. PCT/US2019/034807, dated Dec. 10, 2020.
International Preliminary Report on Patentability for International Application No. PCT/US18/56288 dated Apr. 30, 2020.
EP 18869301.1, Jun. 29, 2021, Extended European Search Report.
Extended European Search Report dated Jun. 29, 2021 in connection with European Application No. 18869301.4.

\* cited by examiner

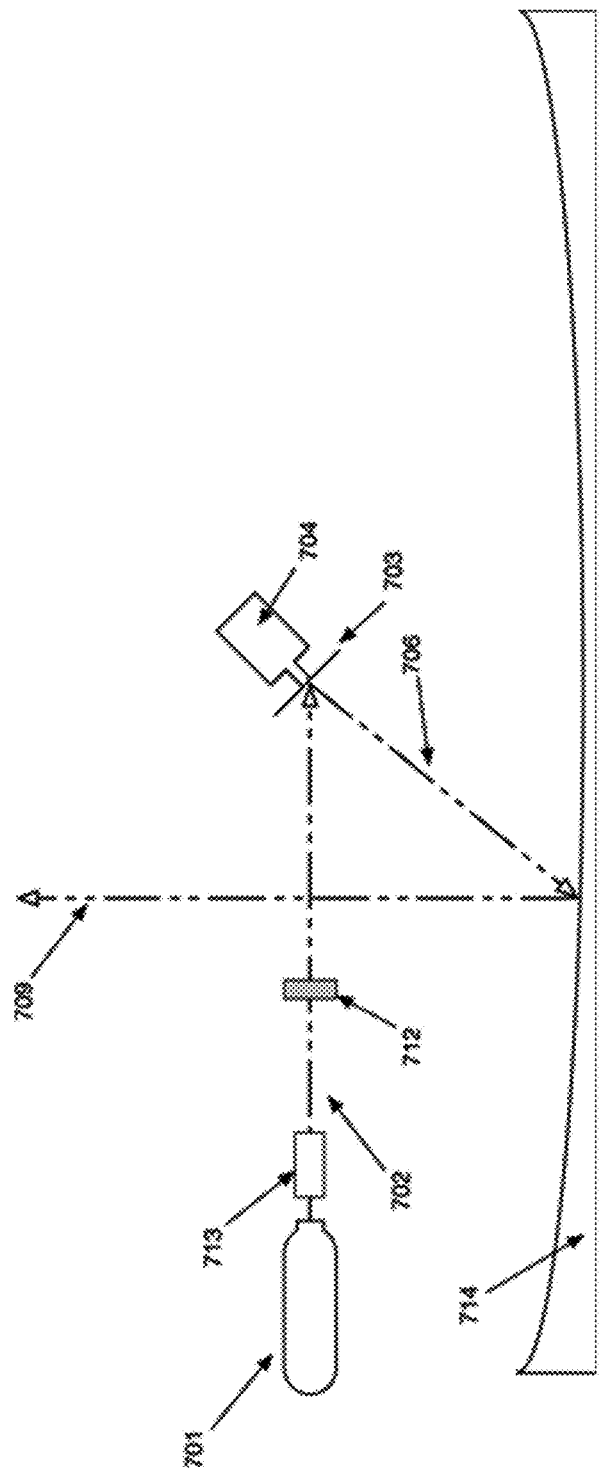

TECHNIQUES FOR DIRECTING LIGHT FROM A MOVABLE STAGE IN ADDITIVE FABRICATION AND RELATED SYSTEMS AND METHODS

CROSS REFERENCE TO RELATED APPLICATIONS

The present application claims the benefit under 35 U.S.C. § 119(e) of U.S. Provisional Patent Application No. 62/679,167, filed Jun. 1, 2018 and U.S. Provisional Patent Application No. 62/817,293, filed Mar. 12, 2019, which are hereby incorporated by reference in their entireties.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform.

SUMMARY

According to some aspects, an additive fabrication device is provided configured to form layers of solid material on a build platform, each layer of material being formed so as to contact a container in addition to the surface of the build platform and/or a previously formed layer of material, the additive fabrication device comprising a container having an interior bottom surface extending in a first direction and a second direction, perpendicular to the first direction, and a movable stage configured to move in the first direction, the movable stage being arranged beneath the container, the movable stage comprising a light source, and a parabolic mirror configured to direct light from the light source through the interior bottom surface of the container at any of a plurality of locations along the second direction.

According to some aspects, an additive fabrication device is provided configured to form layers of solid material on a build platform, each layer of material being formed so as to contact a container in addition to the surface of the build platform and/or a previously formed layer of material, the additive fabrication device comprising a container having an interior bottom surface extending in a first direction and a second direction, perpendicular to the first direction, and a movable stage configured to move in the first direction, the movable stage being arranged beneath the container, the movable stage comprising a light source, and one or more optical elements operable to direct light from the light source through the interior bottom surface of the container at any of a plurality of locations along the second direction.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 7A-7B depict two illustrative approaches to directing light within an exposure module, according to some embodiments;

DETAILED DESCRIPTION

Figure 1A:
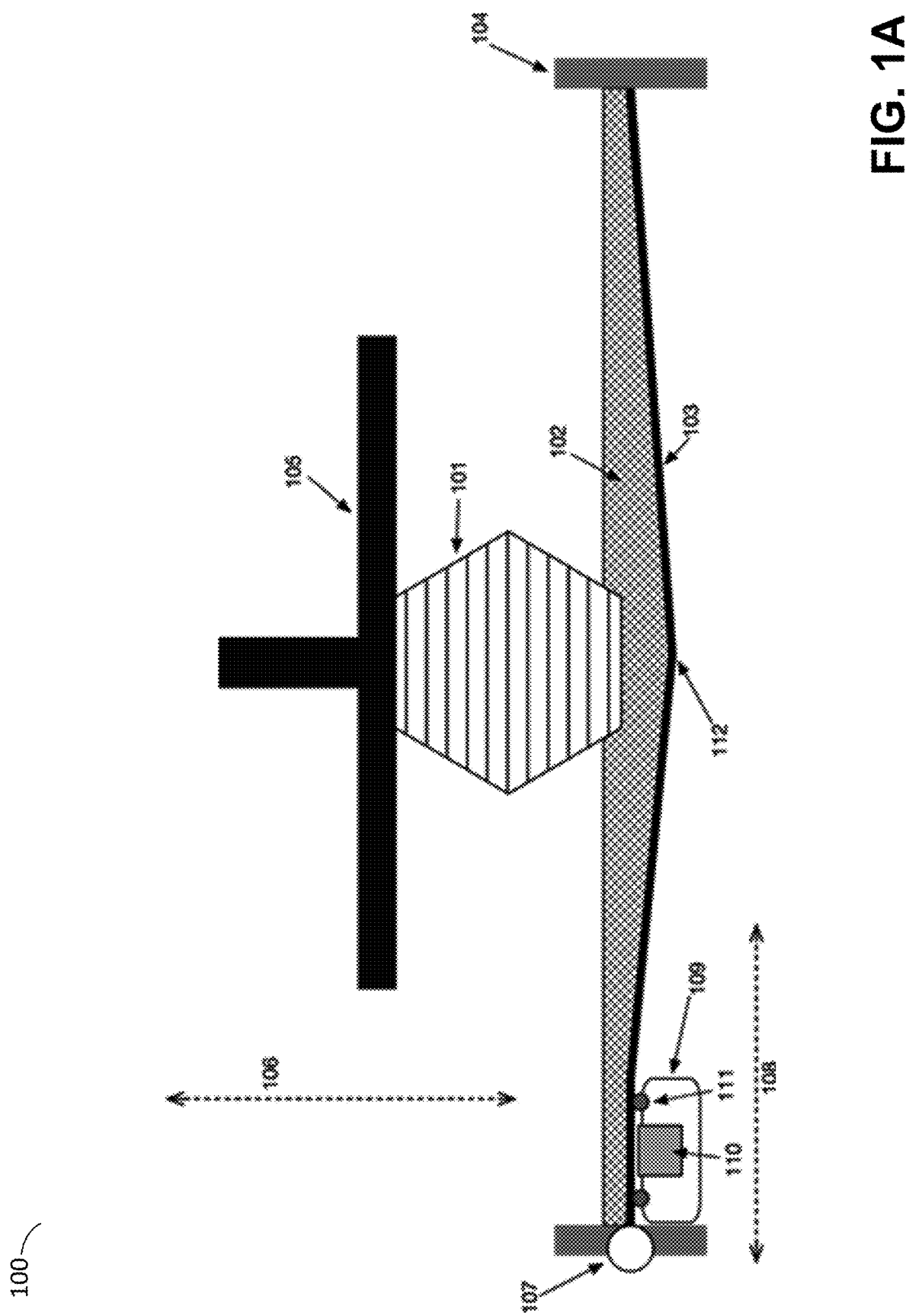
FIGS. 1A-1D depict an illustrative stereolithographic device and stages of its operation, according to some embodiments.

The inventors have recognized and appreciated improved techniques for stereolithography, including improved systems and methods. As discussed above, some additive fabrication techniques may form solid objects by successively forming thin layers of material on a build platform. In stereolithography, such layers of material are formed from a liquid photopolymer. Light is directed to a selected portion of the liquid photopolymer, thereby curing it to a solid (or semi-solid) layer in a desired shape.

Some stereolithographic devices may form solid material in contact with a surface additional to previous layers of the part or the build platform, such as a container in which liquid photopolymer is held. In these cases, actinic radiation (radiation that initiates and/or develops the curing process) may be introduced through an optical window in the bottom of a liquid photopolymer container. These types of stereolithographic devices are sometimes referred to as "inverted stereolithography" or "constrained surface stereolithography" devices.

Since, in an inverted stereolithography device, liquid photopolymer is cured in contact with a surface other than the part being fabricated, the cured photopolymer must be separated from that surface before subsequent layers of the part can be formed. Multiple problems may arise, however, due to the application of force during separation of the part from the container or other surface. In some use cases, the separation process may apply a force to and/or through the part itself. A force applied to the part may, in some use cases, cause the part to separate from the build platform, rather than the container, which may disrupt the fabrication process. In some use cases, a force applied to the part may cause deformation or mechanical failure of the part itself. In some cases, forces applied to a part during separation processes can be reduced by forming the part in contact with an upper surface of a material with properties that assist in physical separation of the part from the material. A layer of this type of material is sometimes called a "separation layer."

"Separation" of a part from a surface, as used herein, refers to the removal of adhesive forces connecting the part to the surface. It may therefore be appreciated that, as used herein, a part and a surface may be separated via the techniques described herein, though immediately subsequent to the separation may still be in contact with one another (e.g., at an edge and/or corner) so long as they are no longer adhered to one another. Adhesive forces may include chemical forces (e.g., bonds coupling the two materials together) and/or mechanical forces (e.g., fluid dynamics and/or vacuum pressure).

Conventional separation layer approaches include thin film approaches in which a film is suspended or otherwise extended over an area to form some or all of a base of a container, and approaches in which a release coating, such as silicone, is applied to the interior of a rigid container. In both cases, the aim is to reduce the adhesive forces between the part and the separation layer (e.g., the film or the release coating) to lower the amount of force that must be applied to separate the part from the separation layer. In thin film approaches, the flexibility of the film can be leveraged to more readily induce a peel of the film from the part as compared with rigid containers containing a release coating. There are additional challenges, however, with the thin film approach that generally are not encountered with the container and release coating approach.

First, it is highly desirable in stereolithography to form solid material in layers that are sufficiently flat to form the layers of the part in desired shapes and so that the layers of the part stack cleanly together. In the case of inverse stereolithography, this requires a sufficiently flat separation layer. In the case of a rigid container and release coating, the release coating can be arranged to be flat since it is attached to a flat, rigid container. In the thin film approach, however, the film is typically suspended over an opening and may sag or otherwise form a non-planar surface such that layers formed in contact with the film are not formed on a sufficiently flat surface. Since layers of material in stereolithography are often formed with thicknesses of hundreds of microns or tens of microns, even a small deviation of the thin from a flat state can negatively affect the desired flatness of fabricated layers.

Some conventional stereolithography devices have employed one or more rollers to push a film into a flat state during fabrication. The inventors have recognized and appreciated that such rollers, however, must be produced to a very high tolerance to consistently produce flat surfaces at the same height. This tolerance includes both the degree to which the cross-section of a roller is circular, since any ellipticity or other deformity could produce inconsistent film heights, and the degree to which the diameter of the roller varies across its length. The inventors have recognized and appreciated that these tolerances can be as small as a few microns. In some cases, at least some of the rollers may have fine or smooth surface finishes, to limit friction against the film and reduce the potential for wear, tear or puncturing of the film.

Second, the above solutions for producing a flat surface in a thin film generally apply some form of tension to the film, whether across the whole film to produce a flat, or close to flat, surface, and/or by deforming the film using one or more rollers. These tensional forces can fatigue the film material over time, and wrinkles or other non-planar deformations may be produced in the film after the repeated application of such forces. In many cases, the defects may have altered the elastic properties of the film enough that the application of additional (or reduced) tension cannot mitigate these defects to produce a sufficiently flat film surface.

Third, it is desirable that a film is relatively permeable to the diffusion (or other transport) of oxygen and/or other gases through the film. These gases can inhibit curing of the liquid photopolymer at the liquid/film interface, leading to uncured and/or partially cured photopolymer at the interface, which reduces the forces needed to separate the film from the cured layer of the part. At the same time, it is desirable for the film to be relatively impermeable to the photopolymer materials, as otherwise those material might cause undesirable changes to the film, such as degradation of the mechanical or optical properties of the elastic material. Photopolymer materials that may cause any undesirable changes in the film due to interactions between the two materials are referred to herein as being "incompatible" with the film. For example, certain substances, such as isobornylacrylate, have been found to cause PDMS to expand, "swell" or even separate from other materials. This behavior may render a PDMS separation layer in a stereolithographic printer unusable. As such, those substances may be referred to as being incompatible with PDMS.

As a result of the above challenges, the choice of materials for a film-based stereolithography separation layer has tended to favor properties such as mechanical strength, over other properties of interest, such as degree of optical transmissivity and oxygen permissibility. For instance, films have conventionally been constructed from materials in the Teflon® family, and/or from other polytetrafluoroethylene-based formulae. While such materials provide for only limited oxygen diffusivity and actinic transparency, the mechanical properties of such materials allow for sufficiently thin films to be utilized in order to partially compensate for such deficits.

The inventors have recognized and appreciated techniques for mitigating the above-described challenges regarding film-based stereolithography separation layers. In particular, the inventors have realized a film approach that includes multiple individual films, film tensioning techniques, and segmented rollers. Taken individually or in any suitable combination, these improvements mitigate at least one of the above-described challenges, as will be described in further detail below.

Another problem that may arise in stereolithographic devices that use a laser light source is that the laser beam must be directed to various positions within the build volume, which are generally positioned at different distances from the laser source. Thus, the optical path length from the laser source to the location at which liquid photopolymer is to be cured will vary across the build volume. Yet laser beams and their associated optics do not always produce a well-defined spot of light at a wide range of optical path lengths, and consequently directing the laser beam to exterior regions of the build volume may result in solid material being formed in those exterior regions in a less precise manner (e.g., due to the spot of light being less distinct). In many stereolithographic devices, this limitation of a laser source places a practical upper limit on the size of the build volume. Some conventional stereolithographic devices may employ a digital light processing (DLP) source as the light source, which can produce light that has the same optical path length to all points in the build volume and can expose a larger portion (e.g., all) of a build area to actinic radiation simultaneously. This can, in at least some cases, reduce overall build time. DLP light sources, however, contain a fixed array of light sources such that their light is directed only to fixed locations within the build volume, such that there may be locations in the build volume to which light cannot be directly applied or cannot be applied with desired accuracy. Furthermore, as the build volume increases, the accuracy of the DLP light source decreases as the light must travel a longer distance and may diverge over the longer distance.

The inventors have recognized and appreciated that a light source that can be moved across the build area would mitigate the above-described issues by allowing light to be directed to any desired location within the build volume by moving the light source. This also allows the distance from the light source to the build volume (the optical path length) to be substantially the same for each position across the build area by moving the light source whilst maintaining a fixed distance from the light source to the build volume. This configuration may allow for fabrication of larger parts in a stereolithographic device by eliminating the practical upper limit on the area of the build volume that can be imposed by use of a laser light source, as discussed above. In some embodiments, a moveable light source may be arranged with one or more rollers in a common unit, or "moveable stage."

In some embodiments, a moveable stage may include a light source that may be directed along a single axis, such that a combination of movement of the moveable stage and directing the light along the axis may allow direction of light to any desired location within a build region. In some embodiments, the moveable stage may move at a constant speed across the build region whilst the light is directed back and forth along the single axis. In this manner, a layer may be cured in a series of scan lines running from one side of the build region to the other.

Following below are more detailed descriptions of various concepts related to, and embodiments of, improved techniques for stereolithography. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

An illustrative stereolithographic device and stages of its operation are depicted in FIGS. 1A-1D, according to some embodiments. As shown in the example of FIGS. 1A-1D, stereolithographic device 100 includes a build platform 105 that is configured to adjust its position towards and away from tank 104 along an axis 106, referred to herein as the Z axis. The build platform 105 may support a part 101 being formed by the stereolithographic process.

In the example of FIGS. 1A-1D, the tank 104 may contain a volume of photopolymer resin 102 and comprise a bottom surface formed by a thin, flexible and/or elastic film 103, substantially transparent to actinic radiation 115. The film 103 may be held under tension by a tensioning device 107. An exposure module 109 may be moved along axis 108, referred to herein as the X axis, such that roller elements 111 are in contact with the lower surface of the film 103. The exposure module 109 comprises an exposure source 110 of actinic radiation 115 which selectively emits actinic radiation along its length (i.e., the axis running orthogonally to both axis 106 and 108, referred to herein as the Y axis). The exposure module 109 further comprises roller elements 111 which are mounted to the top side of the exposure module 109 opposing the bottom of the film 103.

In some embodiments, the film 103 may comprise any highly flexible and/or non-reactive material, such as Teflon® (or other fluoropolymer or polytetrafluoroethylene-based material, such as fluorinated ethylene propylene). The sides of the tank 104 may be comprised of a more rigid material, such as an acrylic plastic, or may alternatively may be formed of a flexible or compliant material.

According to some embodiments, the stereolithographic device 100 may be operated to fabricate an object, or part, 101 by selectively solidifying layers of photopolymer resin 102 onto build platform 105 by exposing the photopolymer resin 102 to a source 110 of actinic radiation 115. In particular, as shown in FIG. 1A, the build platform 105 may be moved along axis 106 to place the bottom of the build platform 105 or most recently formed layer of the part 101 in close proximity to the bottom plane of the tank 104 and the film 103. As the bottom film 103 typically has a certain degree of flexibility and/or elasticity, the weight of the photopolymer resin 102 and/or downwards pressure from the motion of the build platform 106 and part 101 may cause the film 103 to form a "sag" 112, or other form of depression.

Figure 1B:
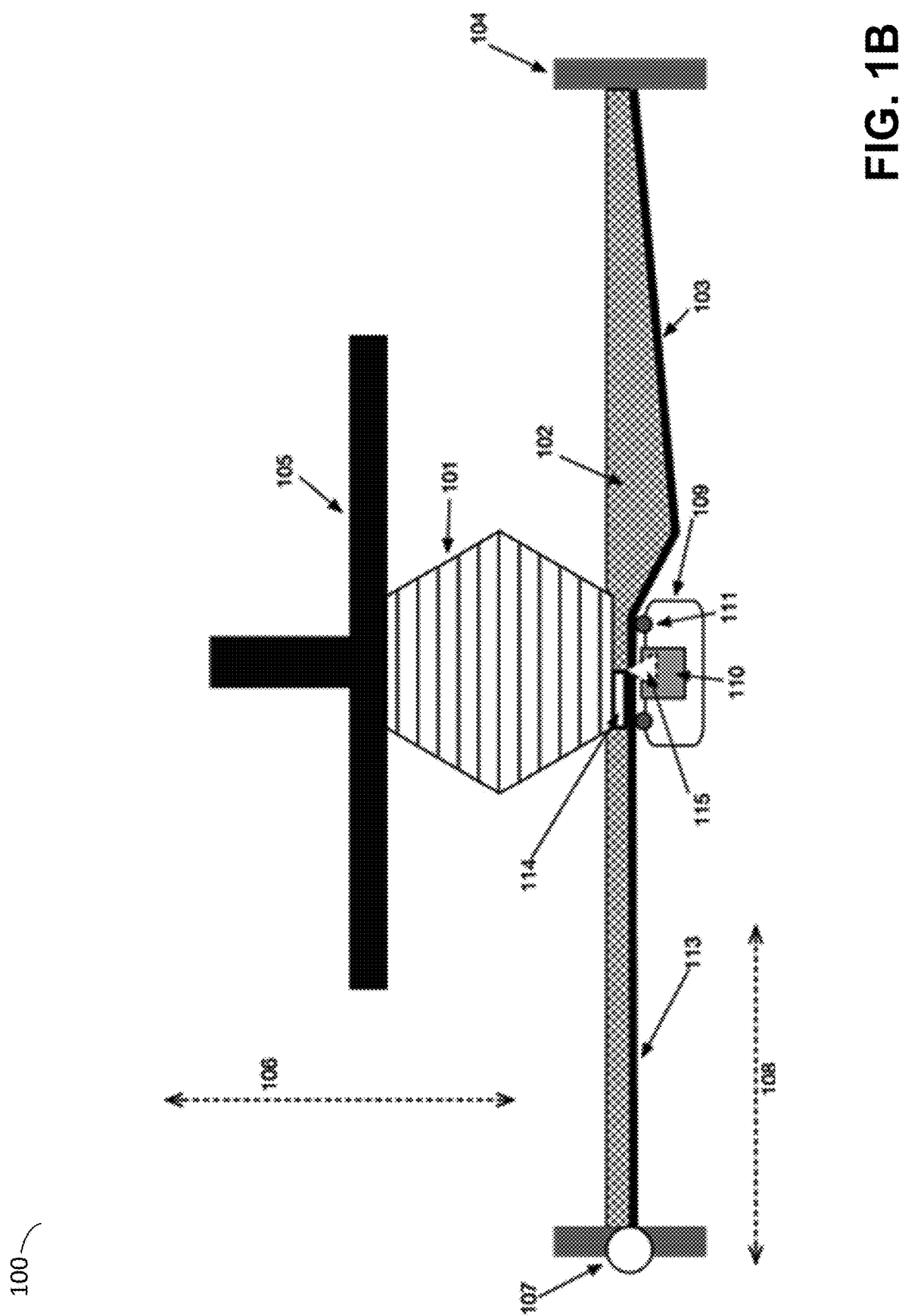
Figure 1C:
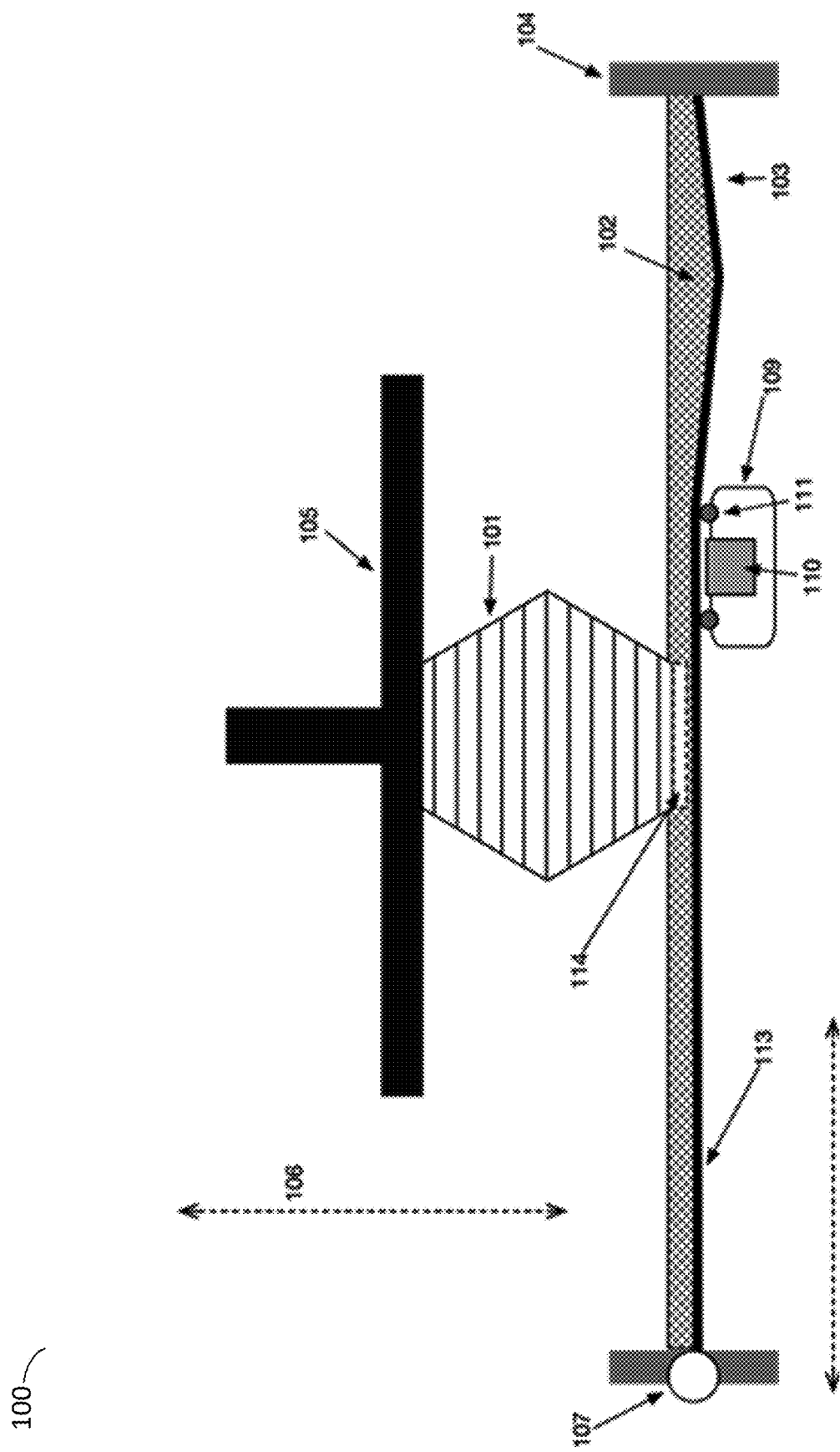

In the example of FIG. 1B, exposure module 109 has been moved along the bottom plane of the tank 104 through axis 108. During this motion, roller elements 111 may press upwards against film 103 in order to flatten any deflection in the film and ensure that the film forms a substantially flat plane between the roller elements in contact with the film. Also during the motion, an exposure source 110 may be activated in order to cause actinic radiation 115 to be selectively emitted at various points along the Y axis. Actinic radiation 115 emitted by the exposure source 110 may be transmitted through the film 103 and irradiate a layer of photopolymer resin 102 located between the film and the lower surface of the part 101. When exposed to the actinic radiation 115, the exposed portion of the photopolymer resin 102 may undergo various reactions, such as polymerization, causing the flowable resin 102 to solidify or otherwise adhere to the previously formed layer of the part 101, forming a new layer 114 of the part 101. As shown in the example of FIG. 1C, the exposure module 109 may continue to move along the X axis while selectively exposing regions along the Y axis using the exposure source 110. Accordingly, any desired region within the X-Y plane of the bottom of the tank 104 may be selectively exposed to actinic radiation, causing polymerization of a new layer 114 of the part 101 in the desired shape.

Following exposure, the newly formed layer 114 may be in contact with both a previously formed layer and the film 103. While adhesion is desirable between the newly formed layer 114 and the prior layers of the part 101, unwanted adhesion may also be formed between the newly formed layer 114 and the film 103. As discussed above, an additional step is typically required to break such adhesive forces before the formation of a new layer, in a process referred to herein as "separation."

Figure 1D:
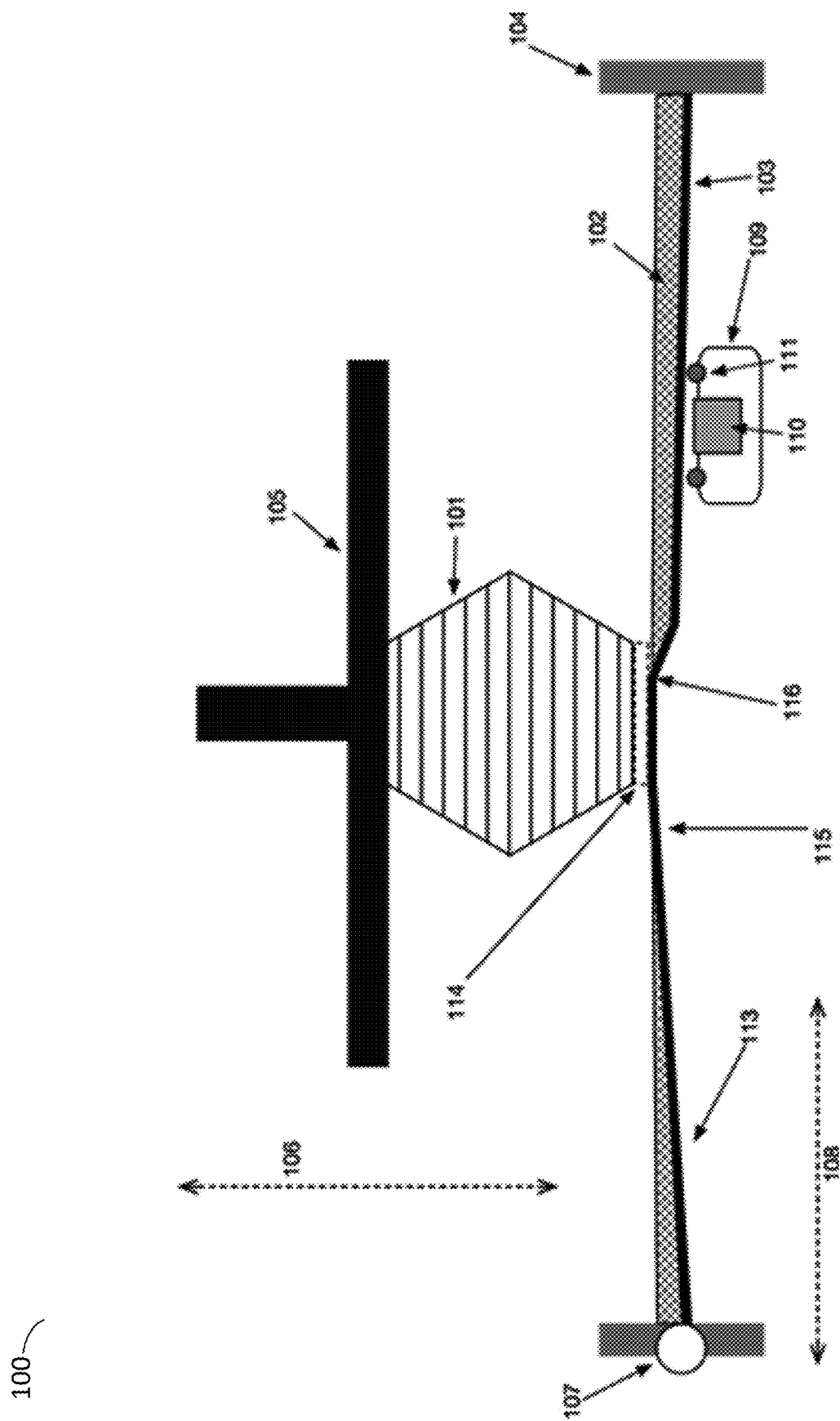

As shown in the example of FIG. 1D, one way of performing separation in illustrative stereolithographic device 100 is to lift the part 101, and thus newly formed layer 114, along axis 106, away from the film 103. Adhesive forces between the newly formed layer 114 and the film 103 may cause the film to deflect upwards 115 as the build platform 105 is moved away. Using a flexible, thin film as at least part of the floor of the container may allow a peeling edge to propagate inward from most or all of the outer edge of the contact area between the part 101 and the film 103. In particular, at a critical level of deflection, at least one portion of the film 103 may begin to separate, or peel, away from the newly formed layer 114, thus forming a peeling edge 116 which propagates across the interfacing surface of the film 103 and newly former layer 114. Separation of this manner may apply considerably less force to the part 101 compared with separation of a part from a rigid container having a release coating, as discussed above.

Following separation pictured in FIG. 1D, a new layer of the part 101 may be formed by returning to the configuration shown in FIG. 1A. In some embodiments, this may comprise returning the exposure module 109 to its original position (as in FIG. 1A) without forming additional solid material. In other embodiments, however, the direction of the exposure module 109 along axis 108 may be reversed, such that the formation process depicted in FIGS. 1A-1D occurs with the exposure module 109 moving in the opposite direction.

According to some embodiments, contact between the roller elements 111 and the bottom of the film 103 may help to form a flat surface of the film 103 against which the formation process of a new layer 114 may occur. In some embodiments, the span between the roller elements 111 (distance between them along the X axis) may be 20-80 mm, but is preferably 40 mm. In some embodiments, the roller elements 111 may extend above the exposure module 109 sufficiently to ensure that the film 103 does not come into contact with the exposure module 109, other than via the roller elements 111. In some embodiments, 1-3 mm may be sufficient to achieve this result, but the extension may vary, in part due to the span between the roller elements 111.

The inventors have recognized and appreciated that the span between the roller elements 111 may limit or otherwise impact the maximum speed at which a new layer 114 may be formed. In particular, following exposure, photopolymer resin may continue to undergo initial chemical reactions for a period of time. During this period, the photopolymer resin may not have reached a sufficient degree of solidification or other physical properties to resist subsequent forces applied by the fabrication process. During the transit of the roller elements 111, comparatively little downwards force may be exerted against the newly formed layer 114 material. Following the passage of the trailing roller element (e.g., the leftmost roller element in the example of FIGS. 1A-1D), however, such forces may increase because at this point the film may begin to sag. Accordingly, it may be advantageous to ensure that the trailing roller element 111 does not reach a section of newly formed layer 114 until a sufficient delay period (referred to herein as a "post-cure delay period") has elapsed. It may thereby be seen that the distance between the roller elements 111 may limit the potential rate at which the roller elements 111 may advance and that a larger span may allow for more rapid advance because the same post-cure delay can be produced yet at a faster speed.

A larger span between the roller elements 111, however, risks compromising the basic function of the roller elements to support the film 103 and to ensure a flat surface for the formation of a new layer 114. These competing interests may be resolved, however, by the addition of additional roller elements 111. As an example, in some embodiments a third roller element may be added behind the otherwise trailing roller element such that exposure may continue to occur between the first two roller elements 111, while a third roller element trails in order to ensure that the newly exposed material has sufficient support for a desired post-cure delay period. Such a third roller element may form a span of greater, lesser, or equal length to the first span, depending upon the amount of additional delay desired. Alternatively, the spacing between the roller elements 111 may be adjustable, whether manually or through active means, depending upon the extent to which additional post-cure delay is desirable and the desired speed of traversal of the roller elements 111. In one such example, one or more roller elements 111 may be configured to be moved separately from the exposure module 109, such that a leading or trailing roller element may be placed into contact with the film 103 with timings independent from the motion of the exposure module 109.

In some cases, it may be advantageous for certain roller elements 111 to be mounted or otherwise positioned with different Z axis offsets from the bottom of the film 103. As one example, in some embodiments one or more trailing rollers may be mounted with an offset below the bottom of the film 103 to avoid excess compression of newly cured material formed on the opposing side of the bottom of the film 103, whereas one or more leading rollers may be mounted at a higher Z axis position, such as at the bottom of the film 103. This higher position may be attained by specifically manufacturing an asymmetrical mount for the two rollers, or may be achieved with the use of additional adjustment features or shims. In such embodiments, the configuration of the roller elements, and thus exposure module 109, may not be symmetric with respect to the direction of motion along axis 108. In such a case, the exposure module 109 may be repositioned between layer formation in order to return to a specific starting position, rather than continued formation of a second layer with a reciprocal motion.

In contrast to the pictured roller elements of FIGS. 1A-1D, some conventional stereolithography devices may include elements other than rollers may be used in order to support the film, such as a static lip, circular bearings, or other protrusions. It is, however, typically advantageous to reduce the amount of friction or other lateral forces exerted by the motion of the exposure module against the film because such forces may scratch or tear the film. In some cases, conventional stereolithography devices apply low surface energy "non-stick" materials or other lubricious materials to the protrusions to reduce friction.

Rollers possess a number of potential advantages compared with static protrusions, including both a minimal profile for the contact area between the element and the film and the ability to "roll," rather than slide, in response to any frictional forces exerted by the film. As discussed above, however, rollers may be disfavored overall because of the demand for small tolerances so that flat surfaces are consistently produced at the same height. Such exacting tolerances may be difficult and expensive to meet in practice. The inventors have, however, recognized and appreciated a roller element design that can produce a sufficiently flat film surface without it being necessary for each component of the roller elements to individually be produced at such small tolerances.

Figure 2A:
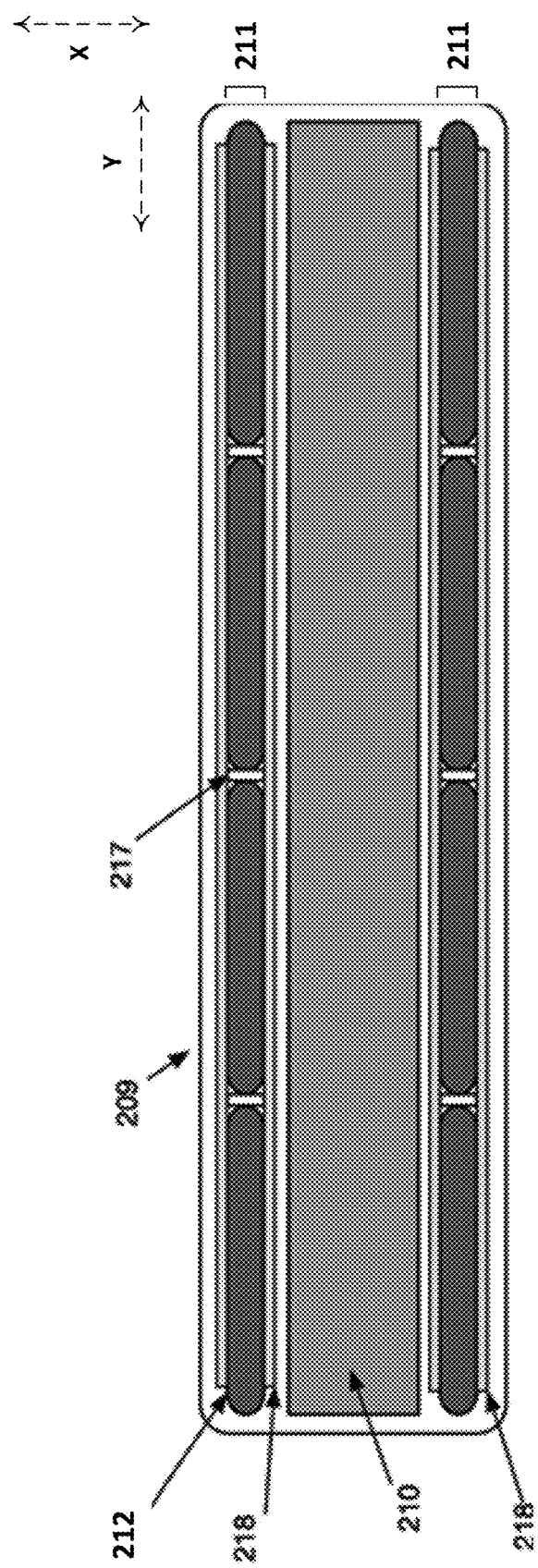
FIGS. 2A-2B depict an illustrative exposure module that includes segmented rollers, according to some embodiments.
Figure 2B:
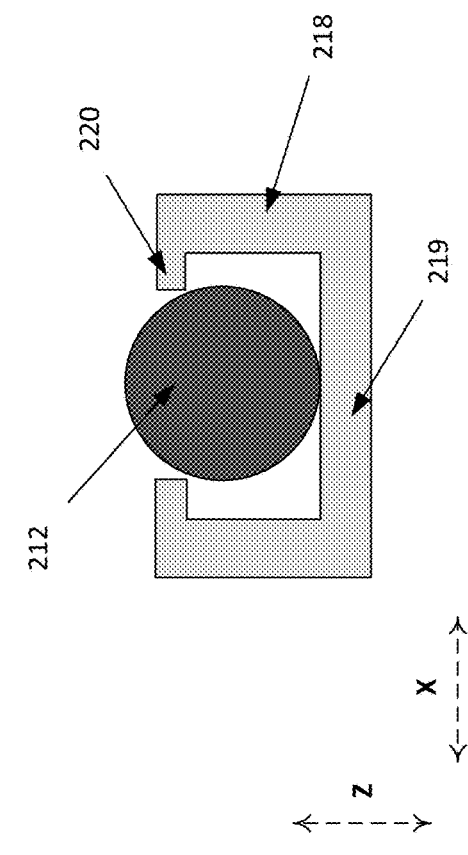

FIGS. 2A-2B depict an illustrative exposure module that includes segmented rollers, according to some embodiments. In the example of exposure module 209 shown in FIG. 2A, each of the two pictured roller elements 211 comprise four roller segments 212. Exposure module 209 may be included as exposure module 109 in the illustrative stereolithographic device of FIGS. 1A-1D such that the roller segments 212 extend along the Y axis of the device 100.

In the example of FIGS. 2A-2B, roller segments 212 may each be formed from any suitable material or materials, but may preferably comprise comparatively incompressible and wear resistant materials, such as aluminum, stainless steel (e.g., 303 grade stainless steel), chrome steel, and/or other grades of steel commonly used for bearings. In some embodiments, roller segments 212 may be treated with one or more coating materials, such as one or more ceramics, titanium nitride, chrome, or combinations thereof. In some implementations, roller segments 212 may include bearing steel rods of approximately 3-10 mm, with each rod having a length of between 20 mm and 60 mm. In some implementations, the exposure module 209 may include four roller segments within each roller element, with the segments having individual lengths of 45 mm and a diameter of 6.35 mm. Although shown to be of equal lengths in the example of FIGS. 2A-2B, the lengths of the roller segments may in general differ from one another. It will be appreciated that the use of four roller segments in the illustrative roller elements is provided as one example, and any number of roller segments 212 may in general be arranged within each roller element 211.

In the example of FIG. 2A, spacers 217 are provided to maintain a predefined separation distance between roller segments 212, which may act to prevent wear and other contact interactions between roller segments 212. In some embodiments, such spacers may be flexible couplings, such as silicone adhesive connecting roller segments 212. In some embodiments, spacers 217 may include an independently movable element, such as a ball bearing.

As shown in the example of FIG. 2B, a roller segment 212 may be disposed within a retaining feature 218. According to some embodiments, the roller segment may be attached to the retaining feature or to some other part of the exposure module 209, or may be held in the retaining feature without attachment. Retaining features 218 may act to limit the range of motion of roller segments 212. In particular, as shown in the example of FIG. 2B, the retaining feature 218 may include overhangs or "fingers" 220, which may limit the lateral and/or upward range of motion of the roller segment 212. The retaining feature 218 may further include a supporting base portion 219 that limits the downwards range of motion of the roller segment. In some embodiments it may be advantageous to add adjustment features such as shims to ensure the rollers are maintained at a desirable height or position. Such adjustment features may further reduce impacts of manufacturing tolerances.

In some embodiments, retaining features 218 may comprise a low-friction and/or wear-resistant material, such as nylon, polyacetal, polytetrafluoroethylene (PTFE), ultra-high-molecular-weight polyethylene (UHMWPE), and/or PEEK, allowing the roller segment 212 to move against the fingers 220 and supporting base 219. It should be noted, however, that it is not necessary for the roller segments 212 to actually roll continually or at all during operation, though such rolling may reduce the lateral forces exerted against a film. In general, the inventors have found that a small amount of clearance between the retaining features 218 and roller segments 212 to be advantageous. In particular, a clearance between the retaining features 218 and roller segments 212 may be between 10 μm and 50 μm, or between 20 μm and 40 μm, or less than 50 μm.

In some embodiments, the roller segments 212 may have less than 200 μm of clearance to move in the Z axis against the fingers 220 of the retaining features 218 and less than 50 μm of clearance to move in the X axis against the sides of the retaining features 218. In some embodiments, roller segments 212 may be constrained from motion away from the supporting base 219 by the tension of a film in contact with the roller segment 212.

In some embodiments, fingers 220 may extend over the roller segment 212 a sufficient amount to restrict the motion of the roller segment. In addition, or alternatively, ends of roller segments 212 may be shaped in various ways to minimize unwanted interactions between segments adjacent to one another along the Y axis. In some embodiments, a cylindrical spacing region may be formed at the ends of each roller segment, the spacing regions having a diameter smaller than the diameter of the non-spacing regions of the roller. In some embodiments, a narrowed positive feature formed by such a narrowed cylindrical segment may be paired with a negative feature in the abutting roller formed by a cylindrical recess, thus partially interlocking the roller segments 212. The sides of the roller segments 212 may further incorporate chamfers, bevels, and/or other features so as to avoid sharp edges that may increase wear against the film 103. According to some embodiments, any film contacting edges of the rollers may be polished so as to avoid wear or deformation of the film.

The inventors have recognized and appreciated that roller segments 212 allow for the roller segments to have significantly larger dimensional tolerances, such as straightness or average diameter, compared with the tolerances usually necessary for a roller element to produce a desired film flatness. As discussed above, a roller elements generally demand small tolerances so that flat surfaces are consistently produced at the same height. A roller element comprising roller segments may, however, produce a consistently flat film surface even though a consistently flat film surface would not result if the same cylindrical material were used as a single piece roller element.

For instance, small deviations in straightness, such as a bend, in a single long roller may result in a significant displacement of the surface of the roller from the midline at the midpoint of the roller. The same degree of deviation in straightness, however, in a shorter length of roller, may result in a much smaller total displacement in the surface of the roller from the midline of at the midpoint of the shorter roller. Accordingly, the use of multiple, and thus shorter, roller segments 212, allows for smaller total displacements, even with the same tolerances in straightness. A much wider range of tolerances may therefore be acceptable in the roller segments 212. In other words, the dimensional tolerance of the retaining features, particularly with regards to the supporting base 219, may be the primary influence on the precision and accuracy of the motion of the roller segments, rather than the dimension tolerances of the roller segments themselves. The provision of a uniformly flat and level supporting base 219 (with respect to the XY build plane), however, may be considerably easier and less expensive.

As an alternative to the depicted segmented cylindrical roller segments 212, in some embodiments, one or more different segment structures may be combined to form a roller segment. For instance, circular ball bearings and/or flexible rods may be arranged in place of the illustrative cylindrical roller segments. Conceptually, a sufficiently flexible rod may decouple the deflection and/or deviation at a given portion of the rod from more distant points on the rod. In some embodiments, an otherwise inflexible rod may be modified by the addition of circular cuts spaced along the length of the rod. As one example, a relatively inflexible rod having a diameter of 6.35 mm and length of 200 mm may be modified by making radial cuts, or trenches, of approximately 2 mm into the rod spaced 40 mm apart along the length of the rod. The remaining core of the rod, having a diameter of 2.35 mm, may be comparatively more flexible than the full width rod and allows for a form of segmentation, whereby unmodified regions of the rod located between trenches are capable of a decoupling deflection at the regions thinned by trenches.

In some embodiments, roller segments 212 may be supported and/or interconnected along a common axis. As one example, roller segments 212 may include a cylindrical hole running lengthwise through the segments 212 and a mounting device, such as a thin rod or flexible wire, may run through a group of segments 212 through such a cylindrical hole. Alternatively, or additionally, roller segments 212 may include a series of protrusions and depressions on abutting ends, such that a protruding portion of a first roller segment 212 may extend partially into a depressed portion of an adjacent roller segment 212.

In the example of FIG. 2A, exposure module 209 further comprises an exposure source 210 located between roller elements 212. The exposure source 210 may be configured to selectively expose a photopolymer to actinic radiation along the long axis of the exposure source 210, representing the "Y" or "fast" axis of the fabrication device. During operation, the exposure source 210 may be progressively moved along the "X" or "slow" axis by the motion of the exposure module 209, as described above. The combination of selective exposure along the "Y" axis and progressive motion along the "X" axis thus allows for selective exposure of arbitrary points within the plane formed by the "X" and "Y" axis. In some embodiments, the exposure source 210 may be capable of exposing multiple locations, or the full width of, the "Y" axis simultaneously. This approach may be referred to as "linear" exposure, as the exposure generated by such an exposure source 210 may take the form of lines or line segments.

An example of one such exposure source may be a linear array of light emitting elements, such as an LED "bar", or similar structure. As another example, a beam of light may be projected onto a rotating polygonal mirror from a light source such as a laser. As the polygonal mirror rotates (e.g., at a constant angular (rotational) speed), the beam may be deflected with a known trajectory, and is therefore directed to, and is incident on, known points. Accordingly, the light source may be activated or deactivated based upon the known rotational position of the polygonal mirror, depending on whether the known path would direct the light source to a known point that is intended to be exposed.

In some embodiments, exposure source 210 may produce a coherent beam of light. For example, the exposure source may include a laser and may produce a laser beam. A beam of light emitted by the exposure source may be projected onto one or more mirrors each attached to a positioning device so that the light may be directed to a desired target location by independently positioning each mirror along one or more axes. In some cases, a positioning device may be an element such as a galvanometer, which may be operated to rotate a mirror coupled to the galvanometer about an axis. As one example, the exposure source 210 may comprise a laser and a galvanometer operable to direct light from the laser to various positions along the "Y" axis.

In some embodiments, the exposure source 210 may further be capable of exposing both a range of the "Y" axis, which may be a subset of the full "Y" axis, and a range of the "X" axis which may be a subset of the full "X" axis. An example of one such exposure source may be multiple rows of linear LED "bars," or a micromirror-based digital projector, or "DLP" system. A further example of one such exposure source may be an LCD display (e.g., a backlit LCD display).

In any of the above embodiments, it may be favorable to control various characteristics of a light beam produced by the exposure source 210, such as spot size and/or cross-sectional shape within a build region (e.g., a focal plane within the build region), so that said characteristics are as consistent as possible across the build region. Any one or more lenses may be employed to direct and/or control characteristics of a light beam to achieve such consistency, such as but not limited to one or more aspheric lenses, spherical lenses, concave lenses, convex lenses, F theta lenses, telecentric lenses, flat field lenses, curved field lenses, a Gradient Index Lens (GRIN Lens), or combinations thereof. It will be appreciated that, in practice, any "lens" referred to herein may be implemented as multiple discrete components and as such any disclosure relating to a "lens" should not be construed as being limited to a single optical component.

Figure 7A:
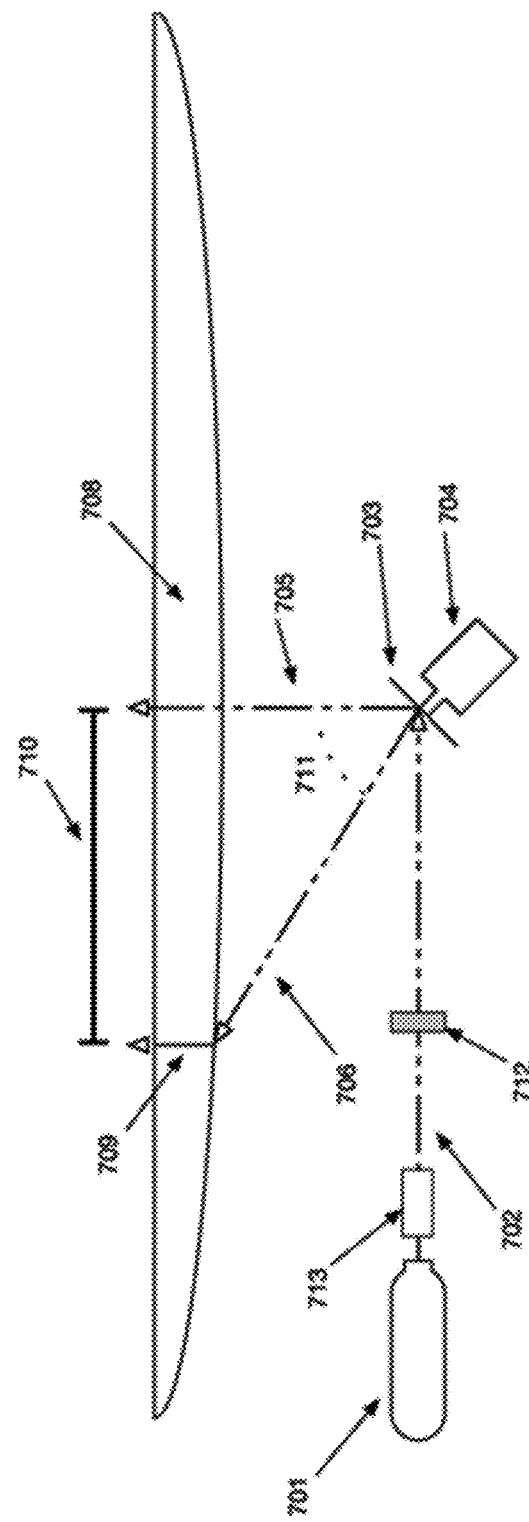

According to some embodiments, an exposure module such as exposure module 109 shown in FIGS. 1A-1D and/or exposure module 209 shown in FIG. 2A may comprise a light source that may be directed to desired locations along the Y axis by directing light onto a suitable lens. FIGS. 7A-7B depict two illustrative approaches to directing light within an exposure module in this manner.

In the example of FIG. 7A, exposure module 700 comprises a focused beam of actinic radiation 702 generated by a source 701, such as a laser module. Source 701 may include, and/or the emitted beam 702 may pass through, various optical elements including one or more lenses, in order to focus, modify the convergence of the slow and fast axis, or otherwise modify one or more aspects of the beam 702.

In the example of FIG. 7A, one or more filtering elements 712 are included within the optical path and are configured to further modify the beam 702. For instance, filtering elements 712 may include one or more spatial filters configured to reduce population-level spatial variability or noise in the beam profile, including higher order modes that may be generated from the source 701, in order to produce a more consistent beam profile, typically with an intensity profile having an approximately Gaussian distribution. The use of such spatial filters may improve the surface finish and/or reduce the minimum feature sizes of parts produced from liquid photopolymer to which the light is directed within a stereolithographic device.

In the example of FIG. 7A, the beam 702 may be deflected by mirror 703, wherein the mirror 703 may be moved by a positioning device 704, such as a galvanometer to direct the light to a desired target. In particular, the positioning device 704 may be configured to deflect the beam 702 to a desired point along the "Y" axis by arbitrarily positioning the mirror 703. Thus, the beam 702 may be specifically directed at an arbitrary point at an arbitrary time, rather than depending on a periodic motion of the deflection device 703 to reach the necessary angle or position. This configuration differs from positioning devices such as polygonal mirrors, which scan across an axis without the control afforded by a positioning device such as a galvanometer.

According to some embodiments, during operation of the exposure module 700 the source 701 may be activated, thereby producing beam 702 and beam 705 after reflection by the mirror 703. The mirror 703 may subsequently be rotated or otherwise moved by the positioning device 704 to direct the beam across a range of angles through angle 711 and thereby ending with beam 706. During this process of exposing the build region through a range of different angles of the mirror 703, the beam exposes a linear segment 710 along a build axis (e.g., the Y axis of the exposure source 210 shown in FIG. 2A, or the Y axis of the exposure source 110 shown in FIGS. 1A-1D).

Depending on the angle of the beam 702 after deflection by the mirror 703, the beam 705 may be travelling perpendicularly to the build plane or may be travelling 706 at an angle to the build plane. An angled path 706 may cause certain undesirable optical artifacts, however, that may degrade the accuracy of layers formed. In some embodiments, this may be addressed by the use of a lens element 708, or compound elements, so as to cause beams incident onto the lens at an angle 706 to exit from the lens 708 in a perpendicular direction 709 to the lens 708, thereby achieving telecentric illumination of the build area. While the lens 708 is depicted in the example of FIG. 7A as a single lens, it will be appreciated that any suitable combination of one or more lenses that are shaped to ensure that existing beams 709 form parallel beam paths may be employed. In some embodiments, lens 708 (or another suitable combination of one or more lenses) may produce light beams with a spot size and shape that is consistent across the entire print area (sometimes referred to as a "flat field"). Such an arrangement may produce a predictable photopolymer curing profile in every location (or the majority of locations) in the build area, which may improve overall part quality including part precision and dimensional accuracy. In some embodiments, the exposure module 700 may be configured to create a flat field illuminating an entire focal plane within the build area using parallel beam paths perpendicular to the focal plane (sometimes called a "telecentric flat field").

As used herein, telecentric illumination refers at least to an optical system configured to produce substantially parallel light beams and which intersect substantially normal to the image plane. Using a source of actinic radiation that is telecentric at all points of the print area may have various benefits to the print process. One such benefit is having a known and consistent angle of penetration. This may provide for each pixel or vector of exposure to occur from the same direction. This may improve dimensional accuracy and consistency across the print area. Some conventional devices may calibrate and adjust a source of actinic radiation using software such that light so produced may approach consistency across all points of the build area, but with this approach the adjusted beam may nonetheless still be inconsistently shaped and/or divergent. As a result, conventional systems may be more sensitive to changes in distance between optical system and print area due to manufacturing tolerances.

In some embodiments, telecentric illumination may be produced via a reflective surface such as a mirror rather than, or in addition to, a lens. FIG. 7B provides an example of such an approach and depicts an exposure module 750 in which light from a light source is deflected by a parabolic mirror 714. In some embodiments, a parabolic reflector 714 may be shaped and mounted such that the focal point of the parabola is located in close proximity to the rotating deflecting mirror 703. The shape of a parabolic reflector 714 may be determined in various ways, including via the parabolic formula $y^2=4fx$ where x and y represent the curve of the reflector in a 2D plane and f the focal length of the parabola, such as the distance between the midpoint of the reflector curve and the position of the deflecting mirror 703.

According to some embodiments, one advantage of the parabolic reflecting mirror in the example of FIG. 7B is that the mirror may produce both a constant spot size and shape across a print plane (e.g., a "flat field"), and/or may produce a consistent perpendicular beam orientation with respect to the build plane, using a single optical element.

In some embodiments, the parabolic mirror 714 may be configured to have the illustrated parabolic cross-sectional shape through multiple different cross-sections of the mirror. For instance, the mirror may be rotationally symmetric about a Z-axis, with each X-Y cross-section through the mirror having the form shown in FIG. 7B. In such approaches, multiple deflecting mirror 703 and positioning devices 704 may be arranged to direct light onto any desired position on the interior surface of such a mirror. For example, two pairs of multiple deflecting mirrors 703 and positioning devices 704 may be arranged to deflect light onto a desired position on the mirror along an X-axis (using one mirror/device pair) and along a Y-axis (using the other mirror/device pair). As a result, light may be directed upwards toward a print plane after being incident on any desired X-Y position on the parabolic mirror.

In the examples of FIG. 7A-7B, the depicted and discussed mirrors and lenses may be formed of any suitable material, such as glass, various optical grade plastics, and/or other materials.

Figure 11:
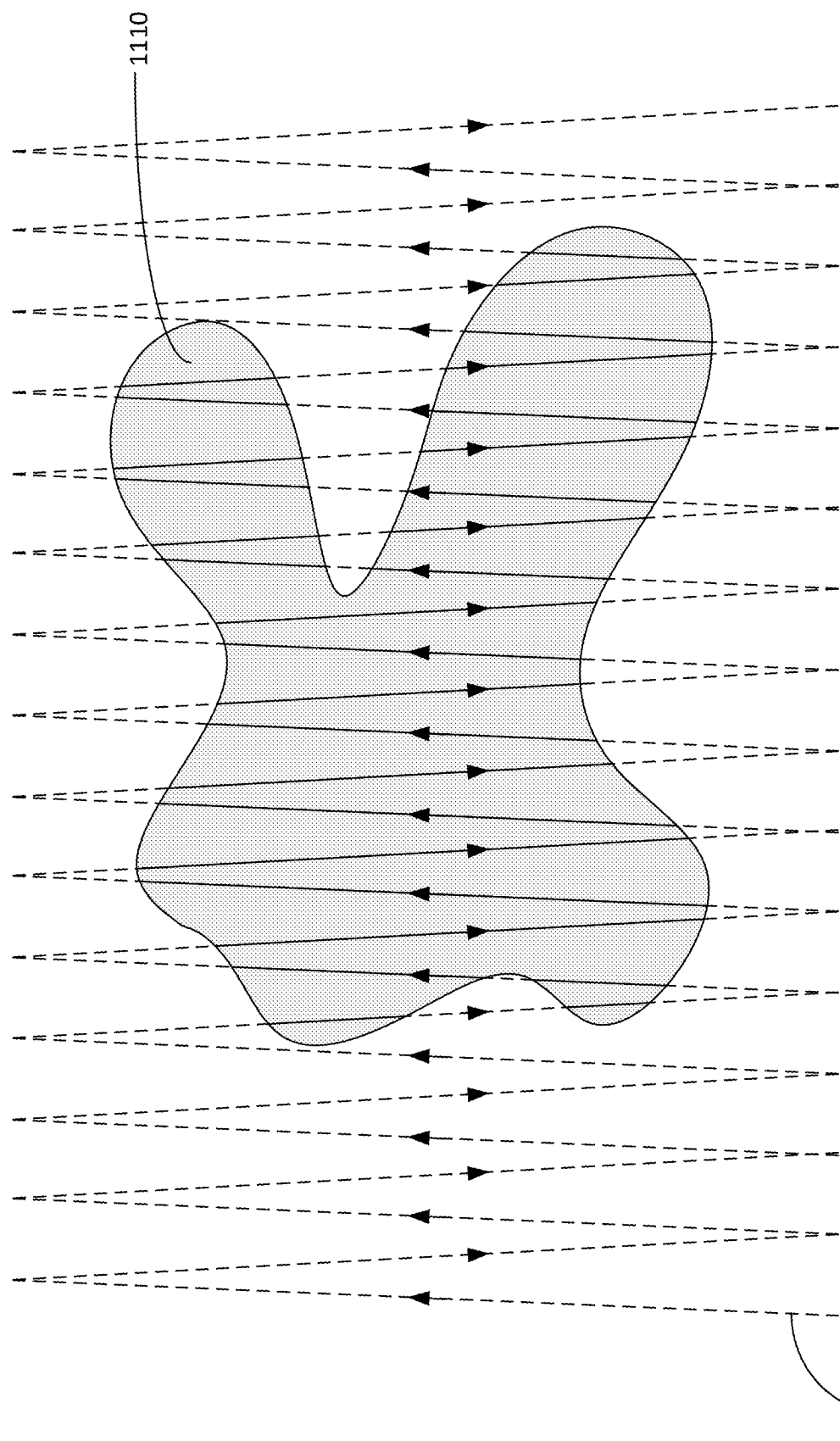
FIG. 11 depicts an illustrative example of curing a layer by scanning over a build region whilst activating and deactivating a light source, according to some embodiments.

As discussed above, an exposure module such as exposure module 109 shown in FIGS. 1A-1D and/or exposure module 209 shown in FIG. 2A may be directed to portions of a build region to cure liquid photopolymer in those portions (e.g., by controlling the positioning device 704 in the example of FIGS. 7A-7B). In some embodiments, the exposure module may cure a layer of photopolymer in a series of scan lines running from one side of the build region to the other, wherein the light source of the exposure module is activated and deactivated so that when the light source is directed to a region of photopolymer that is to be cured, the light source is activated, and deactivated otherwise. FIG. 11 depicts an illustrative example of curing a layer with this technique.

In the example of FIG. 11, a layer is to be formed with shape 1110 (the example of FIG. 11 depicts a build region from above or below). While an exposure source could be directed only to those parts of the build region necessary to cure the layer 1110, in the example of FIG. 11, the exposure source is scanned across the build region such that it traces a path 1120 within the build region. In FIG. 11, the portions of the path 1120 for which the exposure source is deactivated (not curing the photopolymer) are shown in dashed lines, whereas portions of the path 1120 for which the exposure source is activated (curing the photopolymer) are shown in solid lines.

In some embodiments, path 1120 may be produced by an exposure source arranged within a moveable stage that is configured to move at a constant speed across the build region whilst the light is directed back and forth along a single axis. For instance, exposure module 109 shown in FIGS. 1A-1D and described above may be directed to produce a path 1120 by sweeping the direction of the light produced by the exposure module back and forth along the Y axis whilst the exposure module moves under the build region at a constant speed. In some embodiments, the exposure module may move at one speed while activated, but may move at a different speed (e.g., faster) when deactivated. Likewise, in some embodiments, the speed of the projected spot of light may vary, moving faster across empty regions and/or across regions for which precise exposure control is not necessary, such as the interior of a large cured region within a layer.

In some embodiments, the exposure module may contain a light source and lens and/or mirror configuration as shown in FIGS. 7A-7B and described above. For instance, path 1120 may be produced by exposure module 700 disposed within system 100, where only control of the positioning device 704 combined with the motion of the exposure module is necessary to produce the illustrated path 1120. A stereolithographic device producing light by directing light along only one single axis from a moveable stage may have an advantage that it is easier to configure (e.g., program) compared with a stereolithographic device that controls light along multiple axes simultaneously to form layers of material.

As discussed above, in some embodiments a rotating polygonal mirror or similar mechanism can be used to create beam steering in the fast axis. In many cases, however, it may be preferable to use a galvanometer (also as described above) as a steering mirror. As can be seen in the example of FIG. 11, a printed layer may not typically extend over the full print area. As a result, a mechanism such as a galvanometer, which allows for discrete scanning lengths, can improve print time when compared with a rotating mirror which always causes the full range of positions along the fast axis to be scanned. Additionally, it may be favorable for print speed to vary the velocity of the steered beam between cured and uncured segments, in the event of a sparsely spaced printed layer. This can be achieved with a galvanometer, but not with a constant speed spinning polygonal mirror.

While the above discussion of techniques of producing and directing light using an exposure module have been described in the context of a stereolithography apparatus, it will be appreciated that such techniques may also be applied in other types of additive fabrication device. For instance, other additive fabrication devices in which a light beam is directed onto a material, such as selective laser sintering (SLS) devices, may incorporate an exposure module configured to produce a flat field or a telecentric flat field as described above. For example, exposure module 700 or 750 may be employed in an SLS device and light so produced directed to melt or otherwise consolidate a powdered material.

Figure 6:
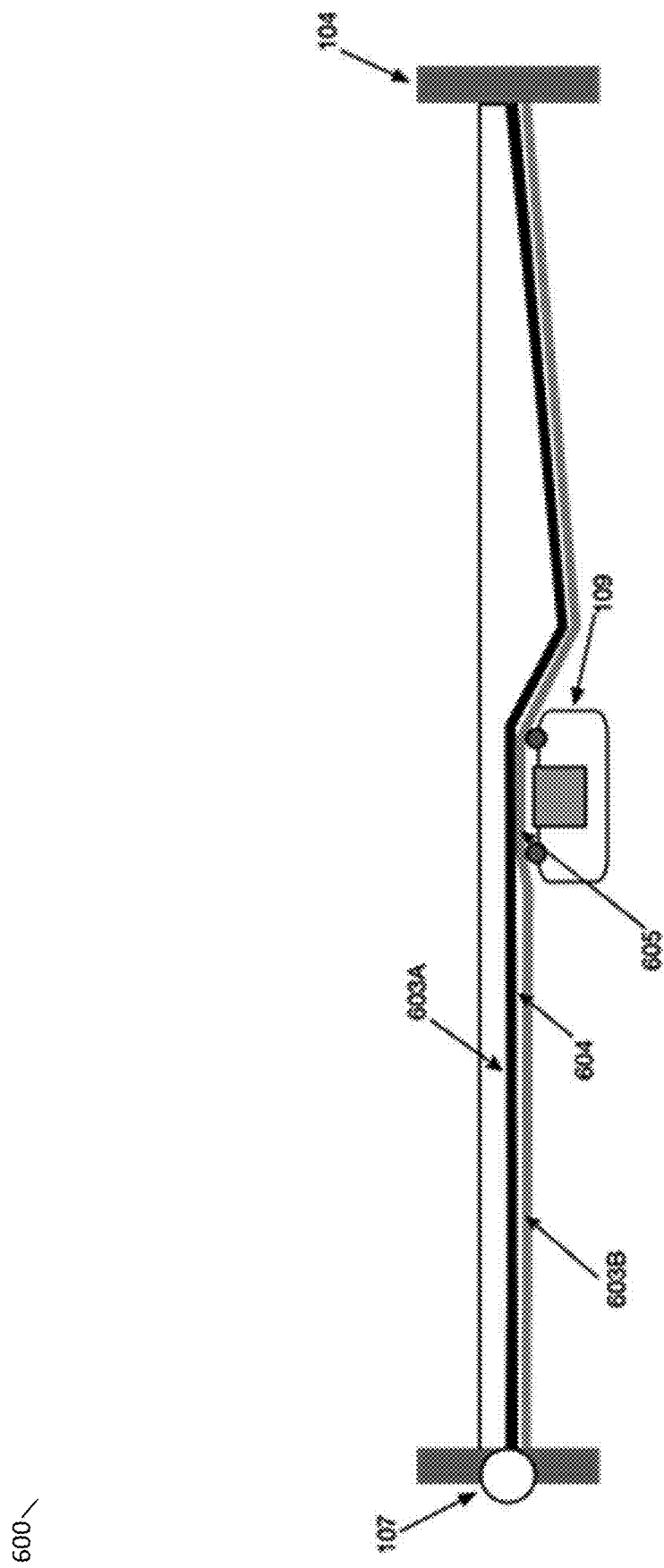
FIG. 6 depicts an illustrative tank for a stereolithography device that includes a multiple films, according to some embodiments.

In some embodiments, a thin film such as film 103 shown in the example of FIGS. 1A-1D may comprise multiple layers of material, such as multiple layers of films and/or films comprising different materials. FIG. 6 depicts one example of such a film.

In the example of FIG. 6, a tank 600 is depicted that includes rigid sides 104, tensioning device 107 and a multi-component film comprising a first film 603A forming the bottom of the tank 104 and a second film 603B located between the first film 603A and the exposure module 109.

In some embodiments, film 603A may comprise a first material that is compatible with and/or not appreciably degraded by contact with expected constituents in desired photopolymer materials. Advantageously, the first film 603A may comprise one or more materials selected to be relatively impermeable to substances within the desired photopolymer resin. It may further be advantageous to select a material to be in contact with the photopolymer resin such that the liquid photopolymer and the selected material possess a high degree of wettability with respect to each other. In particular, it may be desirable to form thin films of liquid photopolymer resin having a consistent thickness against the surface of the film 103 material for subsequent exposure to actinic radiation. To the extent that material possesses a low partial wetting, such a layer may tend to form beads or otherwise tend to cohere rather than to spread readily across the surface of the material into a substantially uniform thin layer. FEP, Teflon AF, and other such "non-stick" surfaces, typically comprise surfaces with low surface energies, thus providing poorly wetted surfaces with regards to liquid photopolymer resin. While this low surface energy may be advantageous for the separation of cured photopolymer resin, it is undesirable with regards to the formation of thin films of liquid photopolymer resin. The inventors have determined that poly(4-methyl-1-pentene), or PMP, in contrast, is substantially more wettable with respect to a wide range of liquid photopolymer resins than FEP, such that thin films of photopolymer resin may more reliably be formed against a first material formed of PMP, despite the fact that PMP possesses excellent separability with respect to cured photopolymer. In particular, the inventors have found that a layer of PMP provides for an effective film 103 for use with a wide range of photopolymer resins.

In some embodiments, film 603A comprises, or is comprised of, PMP. In some embodiments, film 603A may have a thickness of greater than or equal to 0.001", 0.002", 0.004". In some embodiments, film 603A may have a thickness of less than or equal 0.015", 0.010", 0.008". Any suitable combinations of the above-referenced ranges are also possible (e.g., a thickness of greater or equal to 0.002" and less than or equal to 0.008", etc.).

While film 603A may be formed from one or more materials (such as PMP) that both provide good separability with respect to cured photopolymer and are also compatible with a wide range of photopolymer materials, such materials may however lack other desirable properties, such as mechanical properties suitable for rolling or sliding interactions with the exposure module 109. The second film 603B may, in some embodiments, be configured to provide such properties so that the combined multi-component film exhibits each of the above desirable properties.

According to some embodiments, film 603B may comprise Polyethylene terephthalate (PET). According to some embodiments, film 603B may comprise an aliphatic thermoplastic polyurethane or TPU. According to some embodiments, film 603B may comprise polystyrene. For instance, film 603B may comprise, or may be comprised of, a film of optically clear polystyrene.

Irrespective of the material composition of film 603B, in some embodiments, film 603B may have a thickness of greater than or equal to 0.001", 0.002", 0.004". In some embodiments, film 603B may have a thickness of less than or equal 0.015", 0.010", 0.008". Any suitable combinations of the above-referenced ranges are also possible (e.g., a thickness of greater or equal to 0.002" and less than or equal to 0.008", etc.).

In some embodiments, the second film 603B need not be selected to optimize for exposure to photopolymer resin constituents, as deleterious constituents may have only limited permeation through the first film 603A. Instead, the second film 603B may be selected from various materials with other advantageous properties, such as comparatively high degrees of tensile strength and/or resistance to creep or other deformation when placed under tension. In some embodiments, the material used to form the second film 603B may be flexible, but comparatively inelastic (e.g., a thin material with both a comparatively high yield strain and Young's modulus).

In some embodiments, second film 603B may be in periodic contact with various mechanical devices, such as roller elements 111, which may contact second film 603B and/or exert forces against it while in motion. Accordingly, the second film 603B may be advantageously selected from materials with suitable mechanical properties for such repeated contact, such that a lower wear may be achieved. In certain embodiments, such properties may also include superior resistance to abrasion and puncture, comparatively low friction and/or a comparatively high degree of lubricity. In may further be advantageous to select a material with substantial elasticity, such that the second film 603B may be resistant to punctures or other failure modes where excess force is applied. Moreover, the presence of a second film may reduce in any damage or other impact caused by the release of photopolymer resin upon a failure of the integrity of the first film 603A.

In some embodiments, it may be advantageous to add a coating to a film in contact with mechanical devices such as roller elements 111. This coating may preferably be transparent to actinic radiation of one or more relevant wavelengths. This coating may be comprised of any number of materials compatible with the film, of suitable transparency, and with an increased wear resistance or hardness relative to the film. In some embodiments the coating may be comprised of an acrylic or urethane based coating. It may be advantageous for such a coating material to have properties favorable to wear resistance or a high hardness.

In some embodiments, the first film 603A and second film 603B may be separate films and may form at least a partial gap 604 located between the film 603A and film 603B, as shown in FIG. 6. In some embodiments, gap 604 may be produced by mounting films 603A and 603B with an offset between the films.

In some embodiments, film 603A and/or film 603B may be mounted under tension. In such cases, the tension forces applied to the films may tend to cause the films to come into contact, potentially closing off any gap 604 during the application of tension. In some embodiments, the transit of the exposure module 109 and contact between the exposure module 109 and film 603B may cause film 603B to move upwards, into greater contact 605 with film 603A, thereby causing the gap 604 to close at and/or around the point of contact.

The inventors have observed that the presence of a gap 604 may be advantageous where film 603B may have a lower oxygen permeability as compared to film 603A. Without intending to be limited to a specific theory, the inventors believe that the gap 604 may allow for the improved transport of oxygen through the film 603A, thus causing certain inhibition effects with respect to photopolymerization. Such a gap 604 may therefore allow for the selection of a material for film 603B with reduced consideration for the oxygen permeability of the film 603B. Moreover, such an improvement may allow for relatively thicker films to be utilized for films 603A and 603B, while maintaining acceptable degrees of oxygen permeability.

In some embodiments, gap 604 may be produced such that the gap is maintained under the influence of film tensioning. For example, spacing elements may be arranged between film 603A and 603B so as to enforce a gap 604 between the films, at least at or close to the spacers, even if the films are under tension that would otherwise cause them to be substantially in contact with one another. Such spacing elements may be regularly located along the interface between the films. Alternatively, a spacing element (not shown) may be moved between the films so that a gap 604 may be produced and moved to desired locations. In some cases, the gap produced may not be positioned directly at the position of the spacer, and may effectively move in advance of and/or following the motion of the spacing element.

In some embodiments, film 603A and/or film 603B may include non-planar surface features, such as channels, relief features, and/or other textures, such that a plurality of partial gaps 604 may be formed even when the films 603A and 603B are substantially in contact with one another. In some embodiments, such gaps 604 may be ensured by the use of "matte" or otherwise micropatterned films. In some embodiments this matte or frosted coating may be advantageous for a number of reasons. Frosted films may be less prone to suction forces common between two smooth films. Frosted films may also be useful in other applications as they may act as a filter to reduce sensitivity to differing laser spot sizes.

The inventors have observed that the presence of a gap 604 may be advantageous, particularly where film 603B may have a lower oxygen permeability as compared to film 603A. Without intending to be limited to a specific theory, the inventors believe that the gap 604 may allow for the improved transport of oxygen through the film 603A, thus causing certain inhibition effects with respect to photopolymerization. Such a gap 604 may therefore allow for the selection of a material for film 603B with reduced consideration for the oxygen permeability of the film 603B. Moreover, such an improvement may allow for relatively thicker films to be utilized for films 603A and 603B, while maintaining acceptable degrees of oxygen permeability.

In applications utilizing thin films, such as film 103, 603A, and/or 603B, shown in FIGS. 1A-1D and FIG. 6 and discussed above, it may be desirable for the film to be mounted onto a structure, such as the tank 104 in the example of FIGS. 1A-1D. In many cases, it is also desirable for said film to be mounted under tension, or for tension to otherwise be applied to the film at various points of operation.

Figure 3:
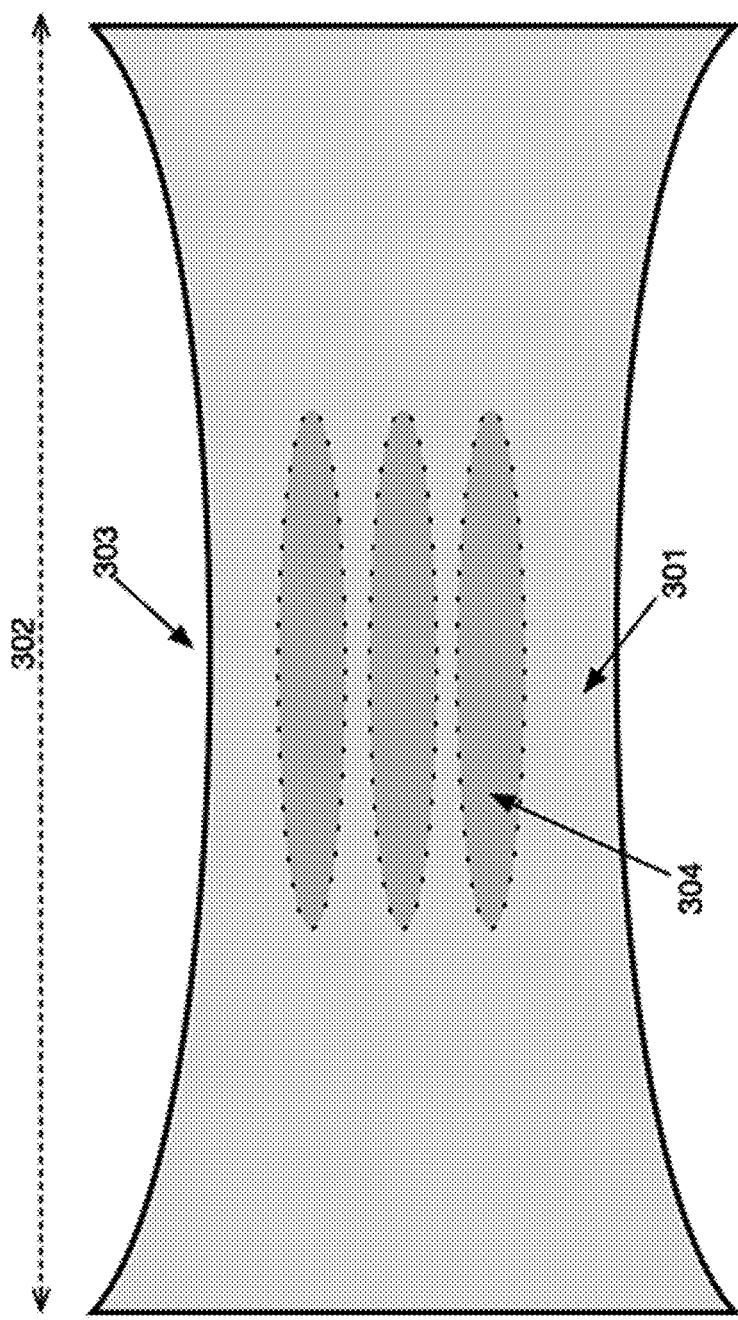
FIG. 3 depicts a film placed under tension along a single axis, according to some embodiments.

Conventional films may, however, exhibit a number of typically unwanted behaviors, such as gradual deformation in the direction of tension forces, sometimes known as "creep." For example, as shown in FIG. 3, a film 301 placed under tension along a single axis 302 (uniaxial tension) may deform, or "waist" 303, in such a way as to cause the dimension of the film to decrease in an axis orthogonal to the axis of the tension force in question. This deformation may, particularly in thin films, result in substantial waves or other distortions in the film, where an otherwise flat film forms non-planar deformations 304, or "wrinkles." And, in stereolithographic applications, such non-planar defects in a film may be especially problematic where such film is intended to be a flat reference surface against which photopolymer material may be solidified, such as discussed above.

Figure 4:
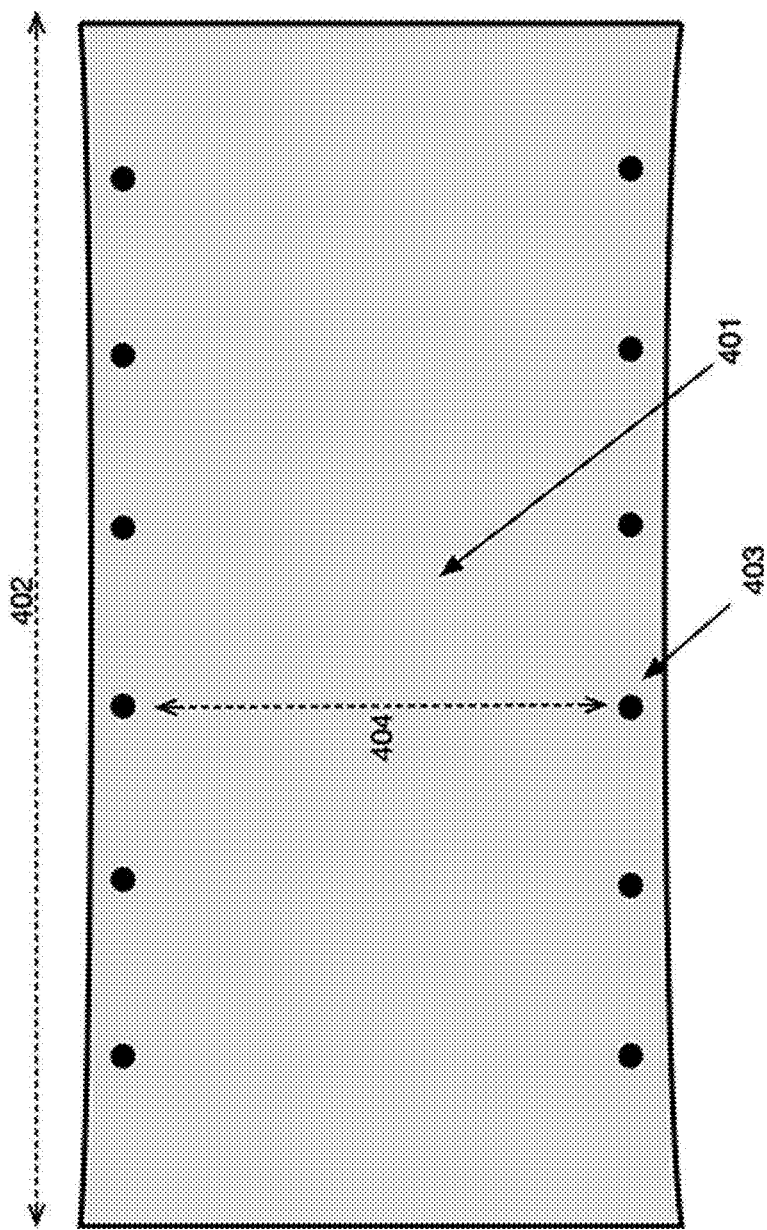
FIG. 4 depicts a film placed under uniform tension in multiple axes, according to some embodiments.

Some stereolithographic devices using tensioned films attempt to address such wrinkling behavior by attempting to place a given film under uniform tension in multiple axes, such as shown in FIG. 4. This approach, referred to herein as a "drumhead" mount, typically requires the film 401 to be secured to a structure on the sides of the film 401, such as by pins 403 or other mounting techniques, and a primary source of tension loaded onto the film 401 along an axis 402. The objective is to both tension the film in one axis 402 while preventing the film from contracting (or waisting) in a second axis 404. Even using such a system, however, an unequal application of tension forces may result in the same manner of deformations caused by uniaxial tensioning. As a result, conventional mounting systems for tensioned films may require undesirable strength, complication, and/or adjustment, in order to provide for a film with both the desired degree of tension and flatness. Moreover, the use of multiple films, such as 603A and 603B, formed of differing materials, and with potentially inconsistent lengths due to manufacturing tolerances, adds additional complexities to the above-described challenges with mounting thin films.

Figure 8:
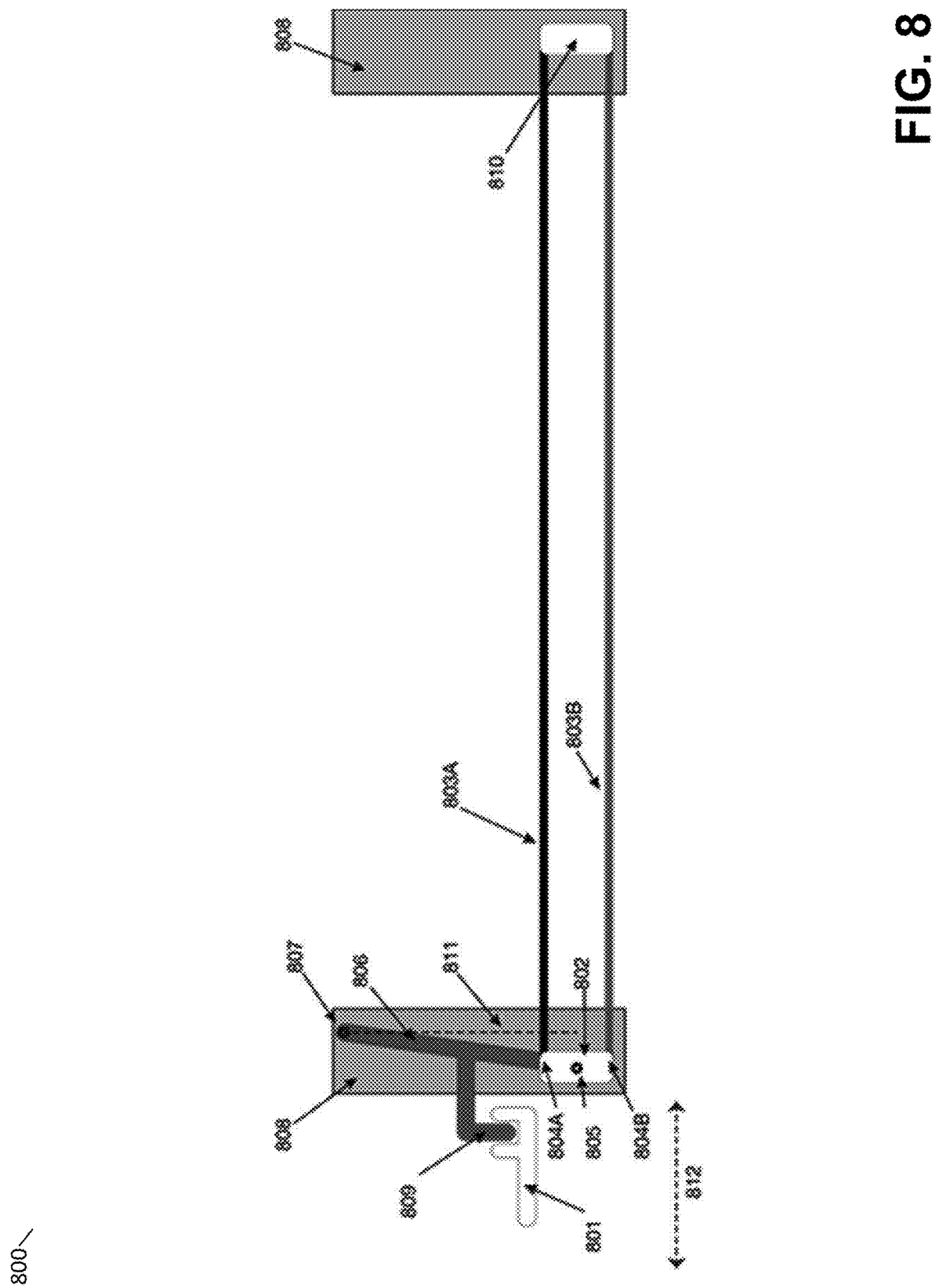
FIG. 8 depicts an illustrative adjustable tension system, according to some embodiments.

The inventors have recognized and appreciated improved techniques for providing film tensioning. FIG. 8 depicts an illustrative adjustable tension system 800, according to some embodiments. In the example of FIG. 8, a tank is adjustably tensioned by means of a tensioning device 801, which is external to the tank and associated with a stereolithographic device in which the tank is installed. This configuration may allow the tank to be removable from the device, wherein the illustrated system 800 includes tensioning device 801 as part of the device with the remaining depicted components being elements of the tank. As shown in FIG. 8, the tank 800 may comprise a film 803A and film 803B, forming a film system 803, such as described above in relation to films 603A and 603B shown in FIG. 6. The films 803A and 803B may be mounted onto or around a distribution arm 802 at points 804A and 804B, respectively. In some embodiments, the distribution arm 802 may be a rotationally unconstrained shaft element.

Distribution arm 802 may be mounted via axis 805 onto a tensioning armature 806, which is configured to be rotatable about axis 807 within a tank side structure 808. Tensioning armature 806 comprises a coupling arm 809 which extends outward such that it may be at least partially captured by a tensioning device 801, associated with a stereolithographic device. The films 803A and 803B may be mounted on an opposing side tank structure 808 at a static mounting point 810. Alternatively, both sides of the tank structure 808 may include dynamic mounting elements. When not inserted into a stereolithographic device or otherwise engaged via the coupling arm 809, the tensioning armature 806 may adopt a relaxed position 811, resulting in a comparatively lower tension placed on films 803A and 803B. In some embodiments, the static mounting point 810 may be attached to a rotational axis in a similar manner to the coupling of elements 802 to axis 807. Incorporating this additional rotational axis coupled to the static mounting point may ensure the film maintains a desirable planar surface during tensioning, since the mounting points 802 and 810 may move to maintain the films in a substantially parallel arrangement.

When the tensioning mechanism 801 of the stereolithographic device is coupled to the coupling arm 809 of the removable tank, and displaced along axis 812, the tensioning armature 806 may be caused to rotate along axis 807, thus displacing the distribution arm 802 in the same direction along axis 812. As will be appreciated, such a motion of the distribution arm 802 away from the opposing mounting 810, or away from the opposing dynamic mounting elements in the case of two or more dynamic mounting elements, may result in an increase in tension along films 803A and 803B and, potentially, a degree of extension or other deformation of said films in response to the tension forces.

Since, in the example of FIG. 8, the distribution arm 802 may rotate about axis 805, the amount of tension applied to films 803A and 803B as a result of motion along axis 812 need not be constant.

According to some embodiments, distribution arm 802 may form a whippletree (also known as a whiffletree) linkage, distributing forces applied via the axis 805 between the films 803A and 803B, attached at points 804A and 804B on the distribution arm 802. According to some embodiments, a whippletree or whiffletree linkage may refer to a rigid body able to apply two or more forces to two or more different points.

While the distances between the axis 805 and the attachment points 804A and 804B are shown to be symmetric in the example of FIG. 8, other embodiments may locate axis 805 such that a desired differential ratio of tension forces may, as a result of varying mechanical advantages on opposing sides of the whippletree linkage, be applied to films 803A and 803B for a given displacement along axis 812. Such a differential may be particularly advantageous where films 803A and 803B are formed of materials with dissimilar responses to tension forces, such as differing elastic constants.

In some embodiments, instead of independently attaching films 803A and 803B to the distribution arm 802, the films 803A and 803B may be bonded together at one end such that they are looped around the distribution arm 802 which may be a rotationally unconstrained shaft element. This configuration may, in at least some cases, allow the unconstrained shaft element to compensate for small differences in the slack of each film due to manufacturing tolerances, minor imperfections, and/or differing reactions to repeated mechanical forces such as different degrees of creep. In some embodiments, the films 803A and 803B may be joined or crimped together at one or more edges while allowing at least one free edge to provide oxygen permeability. The films may be adhered or attached at one end and at the crimp location by any number of methods including pins, adhesives, lamination, a crown piece, etc.

Figure 5:
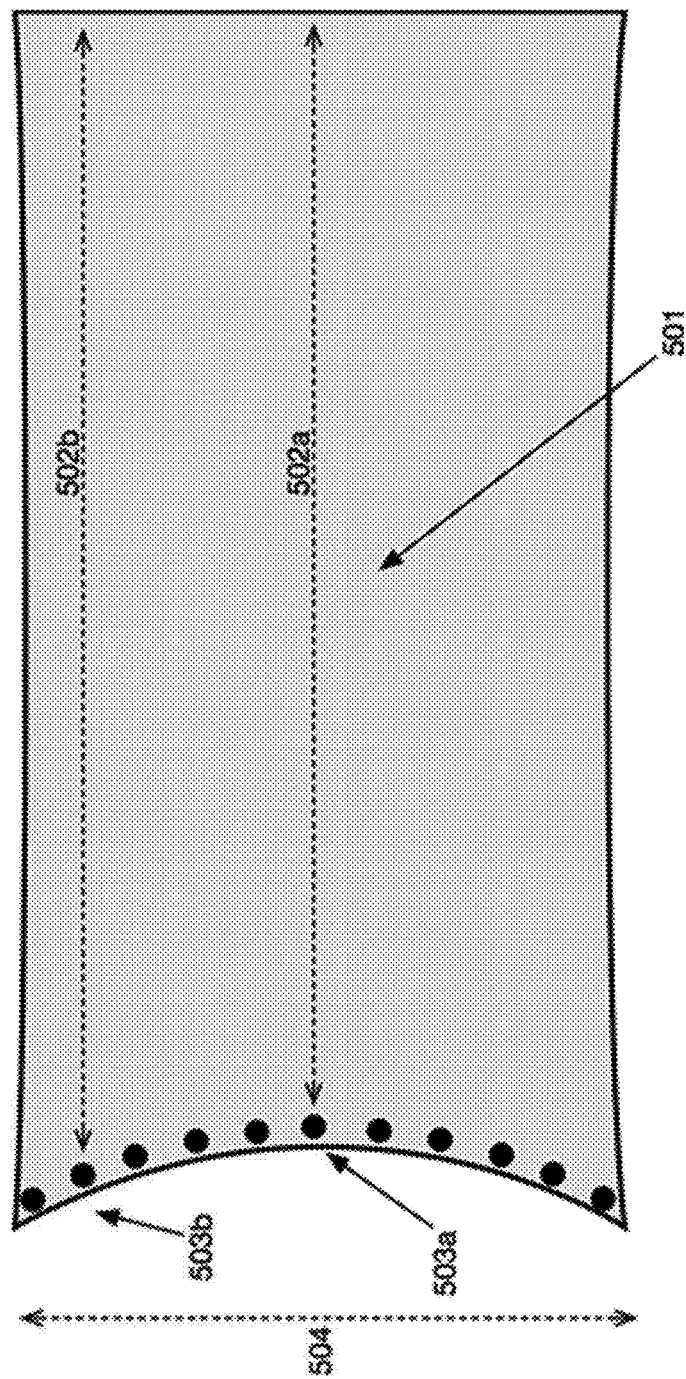
FIG. 5 depicts a film placed under a range of tensions from one side of the film, according to some embodiments.

Another aspect of the present invention allows for the uniaxial tensioning of a film without resulting "wrinkle"-type deformations or similar non-planar features forming. An illustrative embodiment of this aspect is depicted in FIG. 5. As shown, a thin film 501 may be mounted along an axis 504 under tension along axis 502. In this illustrative embodiment, mounting pins 503 may be used to mount the film 501 under tension along the axis 502.

In contrast to the above-described mounting examples shown in FIGS. 3 and 4, however, mounting pins 503 are oriented non-linearly along axis 504. In particular, the position of the each mounting pin of mounting pins 503 may depend upon the distance of the pin 503 from the midline axis of the film 502a, such that pins, such as 503b, further from the midline axis 502a cause the film 501 to extend a greater distance 502b than pins, such as 503a, closed to the midline axis 502*a*. By mounting the film 501 under such a variable geometry, the inventors have found that both planar and non-planar deformations may be substantially reduced.

Without intending to be limited to a specific theory, the inventors have further observed that at least one effective arrangement of pins 503 may correspond with the pattern of tensile forces applied by the film 501 during non-planar deformation. As shown in FIG. 3, for example, a film 301 may be tensioned along on axis 302. After a period of time, which may depend upon the amount of tension, geometry of the film, and/or the materials of the film, deformations 303 and 304 may tend to develop and reach a comparatively stable configuration. Upon measurement, the inventors have appreciated that such a deformation process may result in an uneven application of tensile forces in axis 302 along the mounted edge of the film 301 running perpendicular to said axis. Accordingly, tensile forces exerted at each point along the mounted edge of the film 301 may be measured in various ways, such as by instrumenting individual mounting pins. Pins 503 may then be offset based upon the distance from the midline axis of the film 502*a* such that the amount of force exerted by the pin 503 is approximately the same as the amount of force previously experimentally measured following deformation.

The opposing side of the film 501 (not pictured) may be mounted in any suitable way, such as, but not limited to, mounted using variably offset pins 503. Alternatively, or in addition, experimentally determined individual force measurements may be fit to a curve in order to generate suitable force calculations for arbitrary distances from the midline axis 502*a*. In some embodiments, the inventors have found curves of between 4th and 6th order to best approximate experimentally measured forces as a function of distance from the midline axis of the film 502*a*.

In some embodiments, mounting tensile forces may be applied against the film 501 in a more continuous manner. As one example, film 501 may be conventionally mounted under tension, but where a deflecting element contacts the film 501 such that the film 501 is forced to deflect along the profile of the deflecting element, the profile taking the approximate shape of the curve fit as described above. In the embodiment illustrated in FIG. 8, the mounting edges 804A and 804B along which the film is attached may be linear, or may instead be non-linear and follow the curve or profile described above, thus forming both an attaching point and a deflecting element, based upon the curve of the mounting edge 804A or 804B. In some embodiments, the distribution arm 802 may have the shape of the curve or profile described above such that the films wrapped around the distribution arm 802 are subject to the same mounting profile.

As shown in the example of FIG. 8, tension forces applied to the films 804A and 804B may be applied via displacement of the tensioning device 801 along axis 812. As discussed above, in the example of FIG. 8 the tank structure may be removable with the tensioning device 801 located outside of the replaceable structure. In some embodiments, tensioning device 801 may include any one or more conventional sources of tension forces, such as those produced by extension or torsion springs, potentially requiring user involvement to manually provide initial loading of the system. In some embodiments, tensioning device 801 may comprise a source of linear force, such as a hydraulic cylinder and/or other form of linear actuator. In some embodiments, rotational force may be converted into a linear displacement of the device 801 via means such as rack and pinion mechanisms, thus causing tension forces to be applied to the system.

In some embodiments, it may be advantageous for the tensioning device 801 to apply tension against the film only during the operation of the machine, such that tension is removed or otherwise reduced when the machine is not in use. Such detensioning may be helpful in preserving the working lifetime of the film and/or may allow for a removable film to be removed following a power loss or other failure of the device without requiring removal of the film while under tension.

In some embodiments, a stereolithographic device that includes dynamic tensioning system 800 may adjust the amount of displacement of the tensioning device 801 along the axis 812 during or between cycles of operation. In general, the amount of force applied to films 803A and 803B by a given amount of displacement along axis 812 may be dependent upon various physical properties of the film, including but not limited to a spring constant k. A comparatively inelastic material may have a high k value, such that a comparatively small amount of displacement (x) along the axis 812 results in a comparatively large amount of tensile force (F), as may be appreciated by an application of Hooke's Law (F=kx). As a result, the displacement applied may be selected based on a desired force according to Hooke's law.

In some embodiments, various physical properties of the resin tank assembly may affect the force applied across the films 803A and 803B for a given amount of displacement along axis 812, such as the ability of the assembly or one or more other components to resist torsional, translational, or rotational forces. The extent to which the component(s) resist forces may depend on various factors including but not limited to the type and thickness of material used and the direction of forces applied to achieve tensioning. In some embodiments, the tensioning device 801 and/or the tensioning armature 806 including the coupling arm 809 may be configured to resist forces applied across the films 803A and 803B in order to achieve a desired tensioning. By way of example, instead of a rotational axis 807 as in the example of FIG. 8, the tensioning armature may instead be configured such that it travels along one or more channels or translational elements in the tank side 808 in order to limit the upwards rotation of the film as the device is tensioned. In each case, the rotational axis or the translational elements, the tank side may serve the function of counteracting torsional forces involved in this tensioning mechanism. In another embodiment there may be no rotational or translational channel elements and instead the coupling arm and the tensioning device could be structured with additional reinforcing structures to combat the effect of a rotational force without depending on the resistance provided by the tank side 808. In said embodiment the reinforcing structures could be additional heel or toe features on the connection points that work in conjunction to resist rotational moments in combination with each other. For example, adding a heel or toe feature to either connection point may advantageously distribute forces such that rotational movement may be limited.

In some embodiments, the application of tension to films 803A and 803B may cause a gradual deformation of the films, including stretching or elongating in response to the tension. Such distortions may cause a reduction in the amount of tension generated by additional displacement of the tensioning device 801 along the axis 812. In some embodiments, these effects may be managed via the application of a passive tensioner, such as a counter-spring. For instance, tensioning device 801 may be attached to an extension spring extending along axis 812, such that the "resting" state of the spring causes a force to be applied to the tensioning device 801 along axis 812 away from the tank structure 808. In some embodiments, however, it may be more advantageous to utilize more active tensioning means, such that additional control over the process may be provided. For example, it may be advantageous to vary the amount of tensile forces applied to the film in order to optimize for various process parameters.

In some embodiments, a stereolithographic device that includes dynamic tensioning system 800 may include one or more components configured to measure the amount of tensile force applied by the tensioning device 801, such as via strain measurements or other sensing techniques. Such measurements may, in some cases, be utilized by various control means to provide a form of "closed loop" control over the amount of tension applied via adjusting the positioning of the tensioning device 801.

Figure 9:
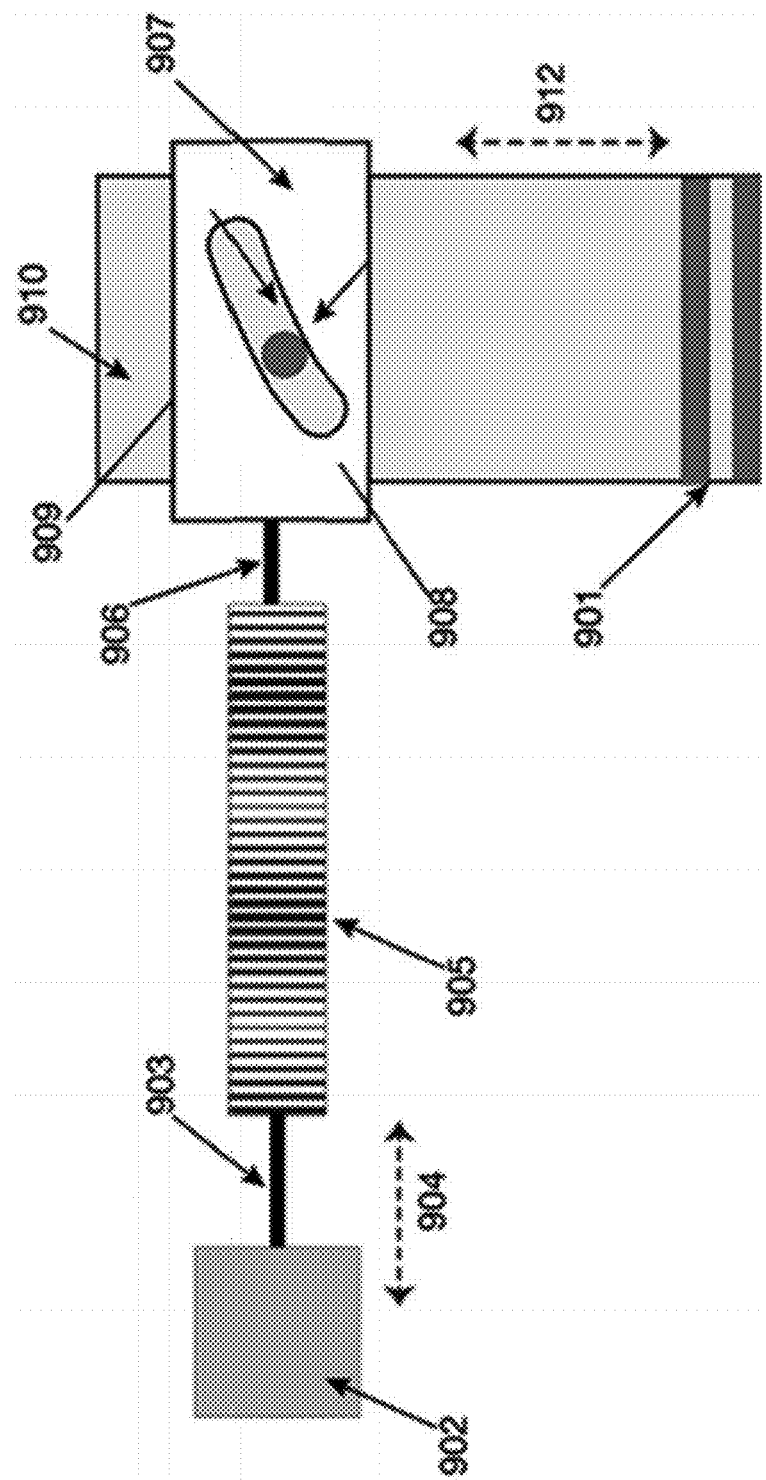
FIG. 9 depicts a second illustrative adjustable tension system, according to some embodiments.

An illustrative tensioning device 900 is depicted in FIG. 9, according to some embodiments. As shown in the example of FIG. 9, an actuator 902, such as a linear motor or rotational motor combined with a rack and pinion type gearing, is configured to cause displacement of a driving rod 903 along axis 904. As a result, the pin 909 moves within a slot 908, causing motion of the tensioning plate 910 along axis 912. The coupling arm 901 may thereby be moved with a varying tension. According to some embodiments, tensioning device 900 may be used in the example of FIG. 8 where the coupling arm 901 is the tensioning device 801 that couples to the coupling arm 809.

Actuator 902 may be instrumented in various ways, including by use of an encoder to provide position information for driving rod 903 and/or strain or stress gauges to measure the amount of force applied via driving rod 903. In the example of FIG. 9, driving rod 903 is coupled to an extension-type spring 905, having a spring constant K along axis 904. Spring 905 is attached, via driving rod 906, to a first coupling plate 907. Coupling plate 907 includes a slot 908. Tensioning plate 910 includes a pin 909 which extends through slot 908 forming a cam-type linkage 908-909, such that motion of coupling plate 907 along axis 904 causes motion of tensioning plate 910 along axis 912. During operation, actuator 902 generates a linear displacement along axis 904 which, ultimately, results in tension forces within the film system 803. This displacement, however, is transmitted and modified via extension spring 905. In particular, extension spring 905 may be advantageously selected to have a spring constant substantially lower than the effective spring constant of a film system to which the tensioning device 900 is coupled (e.g., film system 803 in the example of FIG. 8). As may be understood, coupling plate 907 and slot 908 may be oriented in any manner such that the slot 908 affects the motion of pin 909 to provide the desired motion to the tensioning plate.

As discussed above, various materials used for the formation of films may be comparatively inelastic, indicating that they provide a comparatively high spring constant k, in terms of Hooke's Law. As a result, the tensile force applied to the film may be sensitive to small changes in the amount of displacement of driving rod 903 along axis 904, requiring a comparatively high level of precision in the positioning of driving rod 903. By use of a spring 905 having a spring constant smaller than the comparatively high spring constant of the film or system of films, however, a wider range of displacement of driving rod 903 along axis 904 may be acceptable, allowing for higher precision in the amount of tension forces generated for a given displacement precision. In particular, a displacement of driving rod 903 along axis 904 away from the tensioning plate 910 may result in a significantly smaller displacement of driving rod 906 along axis 904 based upon the ratio of effective spring constants. Displacement of driving rod 906 subsequently causes coupling plate 907 is be displaced along axis 904. Due to linkage formed by slot 908 and pin 909, the displacement of the coupling plate 907 along axis 907 causes a displacement of tension plate 910 along axis 912.

Depending on the geometry of slot 908, however, the tension plate 908 may not be displaced the same distance along axis 912 as coupling plate 907 along axis 904. As an example, the slope of a linear path 908 may define a ratio of motion between tension plate 908 and coupling plate 907. In some embodiments, the inventors have found it advantageous for the path 908 to be non-linear or multi-linear (i.e., composed of linear segments with varying slope), such that the ratio of displacement lengths between the coupling plate 907 and tension plate 908 depends in part upon the location of the tension plate 908. In particular, the inventors have noted that progressive deformations in the film system 803, such as creep, may result in a gradual offset in the required position of tensioning plate 910 in order to effect an equivalent amount of tension force in film system 803. As one example, an illustrative film system 803 may, over time, distort, increasing in length along axis 912. As a result, a tensioning plate 912 applying a tension force to the film system may need to be positioned significantly further away from the tank along axis 912, thus requiring in turn that the coupling plate 907 be positioned significantly closer to the actuator along axis 904. Such a positioning of the actuator, however, may result in less extension in spring 905, and thus a lower total force applied to the film system. In contrast, embodiments utilizing a non-linear path 908, the path 908 may be curved such that the transmission ratio between the tensioning plate 910 and coupling plate 907 is increased the further away from the tank the tensioning plate 910 is located along axis 912. Accordingly, less displacement along axis 904 may be required to achieve the required displacement along axis 912.

As discussed above in relation to FIGS. 1A-1D, layers of material may be formed on a build platform that is configured to move toward and away from the build region. Since the build platform must be placed precisely (e.g., to within several microns) for each layer to be formed with a desired thickness, it is important that the stereolithographic device is able to track the vertical position (the Z axis position) of the build platform.

Conventional stereolithography devices may use positioning devices such as linear actuators and rack and pinion-type transmissions. In some cases, a source of rotational motion, such as a stepper motor, may rotate a threaded rod extending along an axis, sometimes known as a z-axis "screw." The build platform may be mounted, such as by use of a captive nut or similar hardware, such that the rotation of the threaded rod causes the captured nut and platform to be forced up or down along the axis in proportion to the rotations of the threaded rod. The motion of the build platform and threaded rod may, however, have limited instrumentation and as such it is conventionally assumed, for the purposes of motion control and planning, that the stepper motor has unlimited torque and does not experience any "missed steps," regardless of the opposing forces exerted onto the motor through the threaded rod. Such assumptions may not always be valid, however.

While some approaches utilize various indirect measurements in order to detect the resistance to motion, or force, applied against the build platform (e.g., as set forth in U.S.

application Ser. No. 15/623,055, titled "Position Detection Techniques for Additive Fabrication and Related Systems and Methods," filed on Jun. 27, 2017), it may still not be possible to obtain the desired accuracy in force measurements. Moreover, such measurements may typically only be obtained near or at the torque limits of the system, thus increasing the chances of failure or unwanted wear. These problems, and others, may be addressed by the use of embodiments of the invention, such as illustrated in FIG. 10, including in-line force sensing within a linear motion system.

Figure 10:
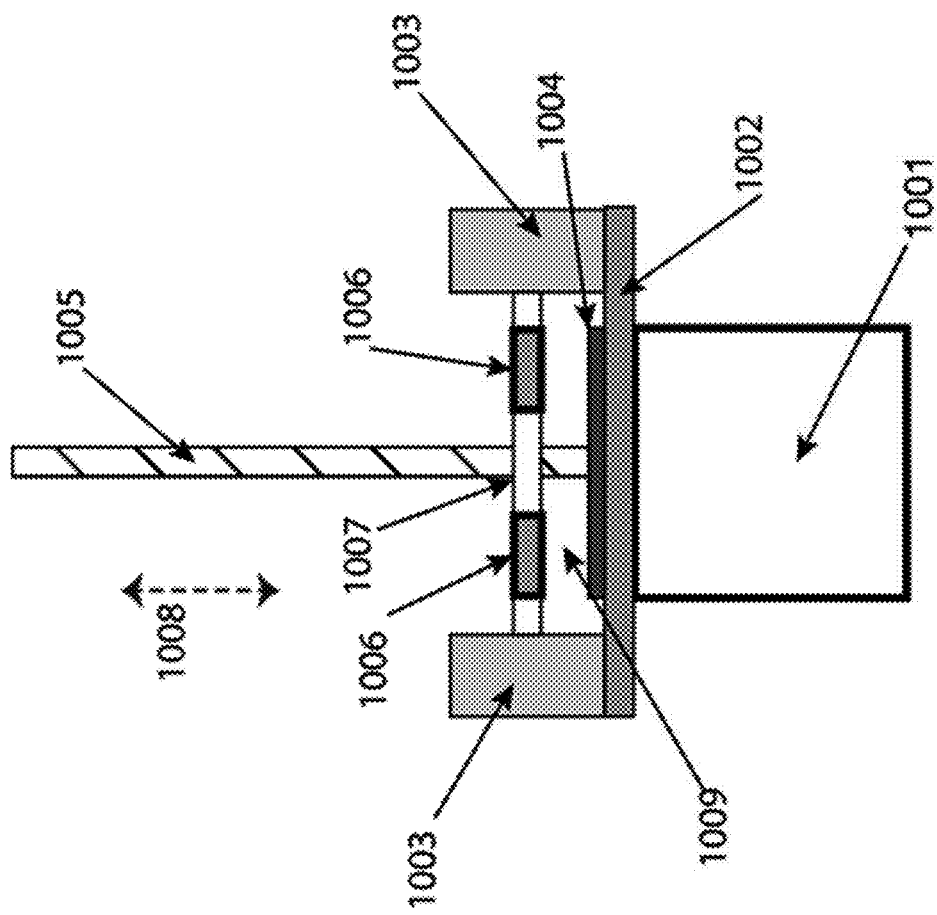
FIG. 10 depicts an illustrative linear motion system that include position sensing elements, according to some embodiments.

As shown in FIG. 10, a source of motion 1001 may be coupled to a rod 1005 for conveying linear motion. In the example of FIG. 10, the source of motion 1001 is a source of rotational motion (e.g., a stepper motor), conveyed along a rod 1005 and converted from rotational motion into linear motion. In other implementations, however, the source of motion could instead directly introduce linear motion along rod 1005. In either case, actuation of the motion source 1001 may cause a force to be applied to the motion source 1001 along axis 1008. For instance, in the example of FIG. 10, actuating the motion source 1001 may cause threaded rod 1005 to rotate such that a captured nut, that is a nut which may not freely rotate, experiences a linear force along axis 1008 towards the motion source 1001. At the same time, motion source 1001 may experience an opposing force along axis 1008, "pulling" it towards the captured nut.

Some conventional systems have dealt with such opposing forces by ensuring that motion source 1001 is mounted to a substantially rigid structure that is capable of resisting the expected forces and preventing substantial movement of the motion source 1001.

In contrast, in some embodiments a linear motion system may instead mount motion source 1001 such that opposing forces will tend to cause movement of the motion source 1001 at least in part proportional to the magnitude of such forces. As shown in the example of FIG. 10, for instance, motion source 1001 is mounted using a spring-like, deformable mounting structure 1002, which is in turn mounted onto rigid structures 1003. In some embodiments, the deformable mounting structure may be a bracket or other structure onto which the motion source 1001 is mounted and wherein the bracket is free to move in a direction parallel to the direction of the opposing forces described above. For instance, one portion of the bracket may be mounted to a rigid structure and another portion may be attached to the motion source 1001. In such an approach, the bracket may bend around the mount of the bracket to the rigid structure when forces are applied to the motion source 1001.

During operation, opposing forces against motion source 1001 may cause the motion source 1001 to move along axis 1008 and cause the deformable mounting structure 1002 to deflect along axis 1008 in proportion to the amount of force applied.

For example, a spring-like deformable mounting structure 1002 may comprise, or be comprised of, a sheet of spring steel having a Hooke spring constant of k along the axis 1008. An application of a force F along this axis 1008 may thus cause the deformable mounting structure 1002 to deflect approximately a distance F/k along axis 1008 as a result of Hooke's Law. As a result, measuring the amount of this deflection indicates the amount of force applied by the motion system. For instance, the measurement of deflection may be converted into a measurement of the forces by applying Hooke's Law and/or a suitable mathematical or heuristic model describing the deflection of the mounting structures 1002 in terms of the amount of force applied against said structures.

The amount of deflection of the deformable mounting structure 1002 may be measured in any suitable way, such as by detecting deflection via optical and/or mechanical measuring means. The amount of force applied by the motion system may then be estimated based on this measurement. In the example of FIG. 10, a measurement of the amount of deflection of the deformable mounting structure 1002 may be obtained via one or more non-contact sensors 1006 mounted on a reference plate 1007. The non-contact sensors 1006 may, for instance, measure a position of the deformable mounting structure 1002 via inductive and/or capacitive sensing.

Various forms of sensors 1006 may be utilized. One consideration is the degree of measurement accuracy required, which is partially determined by the expected amount of deflection. In some embodiments, the inventors have found that compact size is a primary concern, and so have chosen spring-like mountings with comparatively high spring constants, such as 1 N/um, thus requiring comparatively high precision measurements over a comparatively small distance. In some embodiments, the inventors have found that inductive distance sensing may provide such measurements, particularly when combined with a reference target 1004 formed of an aluminum inductor. In such configurations, sensors 1006 may comprise inductive coils connected to an inductance-to-digital converter, such as the LDC1612 processor sold by Texas Instruments, in order to generate a digital signal corresponding to the distance between the sensor coils 1006 and the reference target 1004.

In the example of FIG. 10, according to some embodiments, a reference target 1004 may be mounted onto the deformable mounting structure 1002. The reference target 1004 may be a structure that is more easily sensed by the non-contact sensors 1006 than the deformable mounting structure 1002.

Various applications may be envisioned for the position detection techniques described above in relation to FIG. 10. For instance, the force sensor of FIG. 10 may be coupled to a build platform such that the axis 1008 is the Z-axis direction of motion of a build platform (e.g., axis 106 shown in FIGS. 1A-1D for build platform 105). This configuration may allow a force being applied to the build platform to be measured via the force sensor described above. Measuring a force applied to a build platform may have various beneficial applications, including measuring an extent to which a surface below the build platform (e.g., a container) resists downward motion of the build platform, an extent to which upward motion of the build platform is resisted (e.g., as a result of the build platform, or a part attached to the build platform, adhering to a surface such as a container). Various calibration and error checking operations may be envisioned based on such measurements, examples of which are described below.

Figure 13:
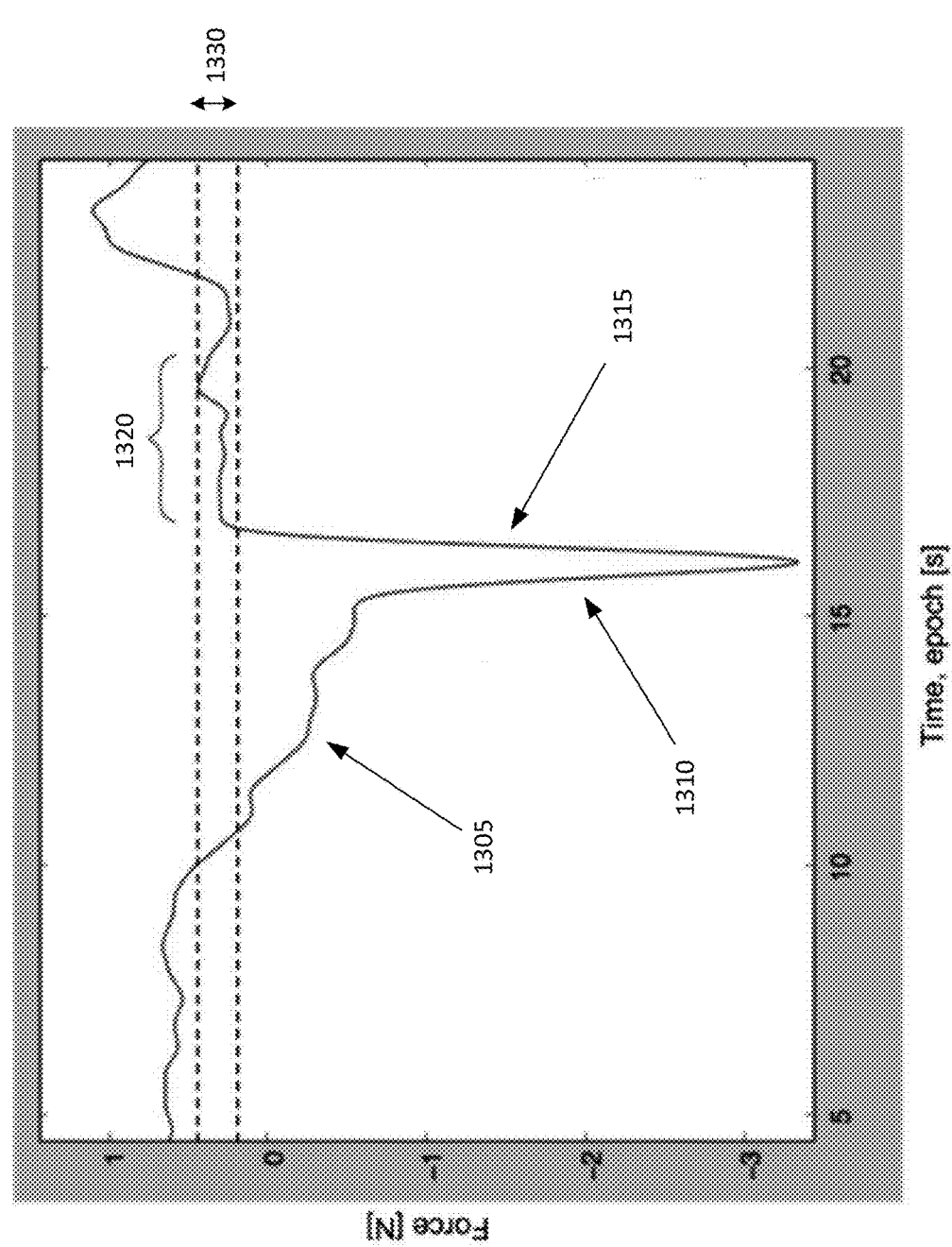
FIG. 13 depicts a measurement of force measured by a position sensing system over time, according to some embodiments.

FIG. 13 depicts an illustrative sequence of measurements taken by a force sensor that measures a force applied to a build platform, according to some embodiments. In the example of FIG. 13, graph 1300 shows a measurement of force (vertical axis) taken over time (horizontal axis). Initially in the pictured sequence, an initial layer of a part is being formed on a build platform or on previously formed layer of a part attached to the build platform (e.g., as in the example of FIGS. 1A-1D discussed above). Subsequently, the build platform begins to pull on the part, and thereby on the container to which the part is adhered. This causes the force measurement to increase in magnitude at 1305 as the container initially resists this motion. This force increases at 1310 until the part separates from the container and the force quickly reduces at 1315. While various different types of container may be utilized in stereolithography, including rigid containers with an elastic coating or container having a thin film as a bottom surface, it is expected that a spike in the force measurement would be observed in each case, although the exact form of the force versus time measurements may be quite different for different container materials. As a result, irrespective of the type of container, a moment at which a part separates from a container may be identified by identifying a spike in the force measurement, the spike being a rapid increase and decrease in the force measurement. Alternatively or additionally, separation may be based on detection of the force being within a zero window (e.g., window 1330).

In some embodiments, a sequence of motions of the build platform may be selected based on a time at which the part is detected to separate from the container. For instance, a "squish" move, which is a sequence of motions in which the part is positioned close to the container in preparation for forming another layer and typically ends with a period in which the part is held at a fixed position (a "squish wait"), may be performed based on how long separation of the part from the container is observed to take. A plurality of pre-baked squish moves may be stored or otherwise accessed by the printer and one of the moves selected and performed based on a length of time between initiating separation of the part from the container and detecting completion of said separation.

In some embodiments, various operations of a wiper in an additive fabrication device may be adapted based on measurements by a force sensor that measures a force applied to a build platform. For instance, the applied force to separate a part from a container may depend on the viscosity or other properties of the liquid in the container. As a result, the wiper may be operated based on the force, which may implicate particular properties of the liquid. For example, the wiper may operate comparatively longer when the measured force indicated the liquid is comparatively more viscous to aid in recoating. As another example of adapting wiper motion based on measurements by a force sensor that measures a force applied to a build platform, as the surface area of a part contacting the container increases, the measured force may also increase due to increased adhesion. Recoating of the larger area in the absence of a wiper may also increase because there is more space for the liquid to flow back into after the part is moved away. As a result, the wiper may be operated to perform greater recoating when the surface area of contact is greater. In general, however, the speed of wiping, pauses between wiping, number of wiping cycles, squish wait may all be adapted based on the force measurement.

Figure 14A:
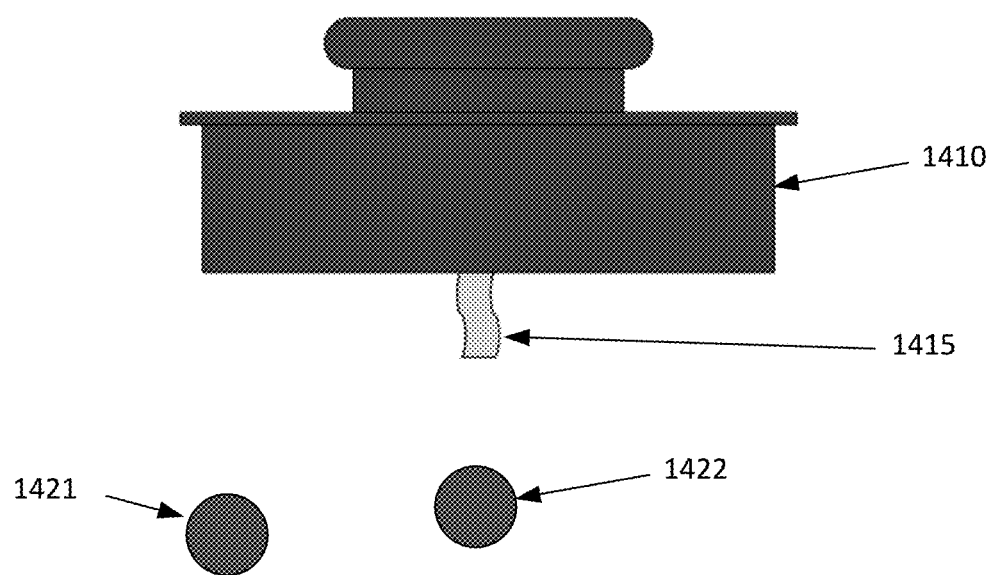
FIGS. 14A-14B depict a method of sensing a position of a roller of an exposure module, according to some embodiments.
Figure 14B:
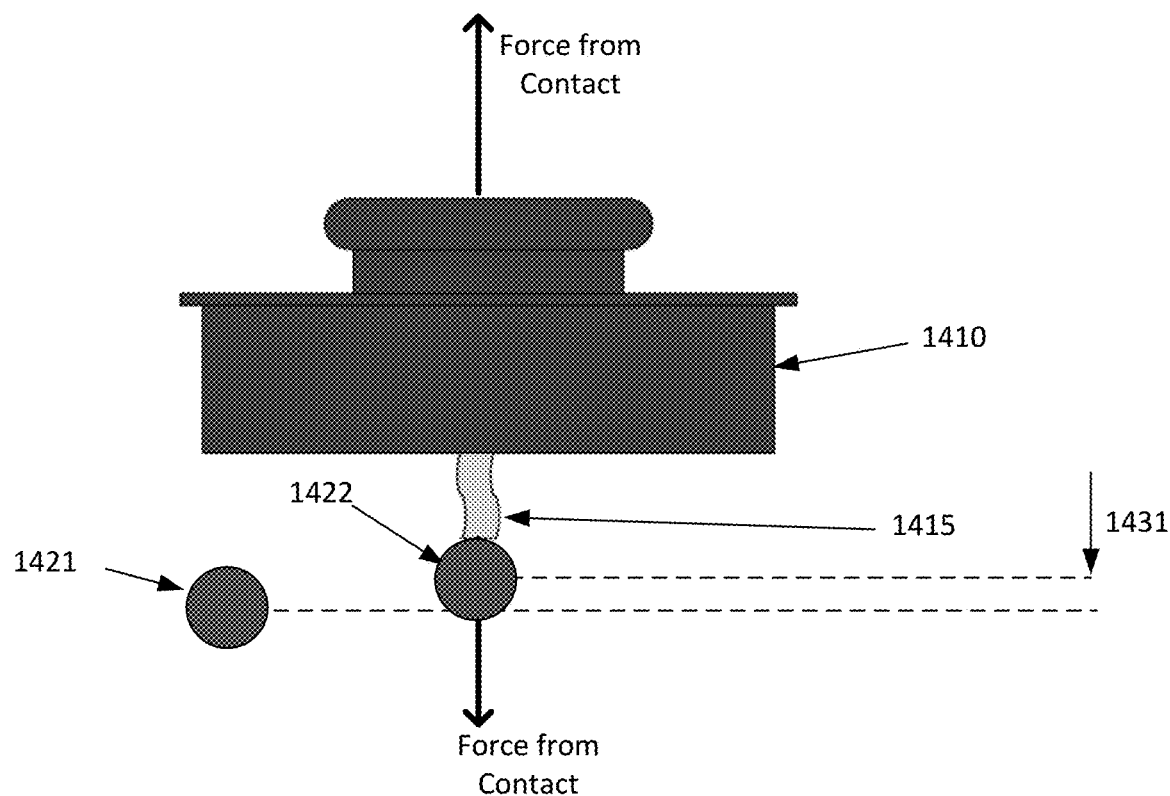

FIGS. 14A and 14B depict another application of force sensing using a build platform, according to some embodiments. In the example of FIG. 14A, a build platform 1410 is coupled to a force sensor such as the arrangement shown in FIG. 10. The build platform has an attached probe 1415, which may comprise any vertically extending shape that is glued on, adhered to, or otherwise attached to the build platform. In some cases, the probe 1415 may be a part fabricated onto the build platform via typical printing techniques. The probe 1415 may or may not have a known height.

In the example of FIGS. 14A and 14B, two rollers 1421 and 1422 of an exposure module (e.g., rollers elements 111 in stereolithographic device 100 shown in FIGS. 1A-1D) are arranged below the build platform 1410 such that one roller is beneath the probe 1415. The build platform may be lowered toward the roller whilst a force applied to the build platform is measured. Contact between the roller and the build platform may be identified when a force resulting from contact is measured by the build platform, as shown in FIG. 14B. In cases where the height of the probe 1415 is known, a position of the roller 1422 may be determined based on the probe height and the position of the build platform when the force is detected. The force detection may be performed in numerous ways, including by detecting a force above a given threshold value. Another way to detect the height of the probe is to measure the rate of change of the force with height. Subsequent to touching the rollers, the rate of change of the force with height is essentially due to the spring constant of the machine. The height at which Hooke's law implies a zero force by fitting observed data to the spring constant can thereby be used to identify the height at which the build platform touched the roller.

In some embodiments, the height of the probe 1415 may not be known, but can be used to determine the different in heights (the "bias") between the rollers 1421 and 1422 (labeled as distance 1431 in FIG. 14B). To determine the bias, the probe may be lowered onto each roller and a position at which contact is identified via the force measurements recorded. The bias 1431 can thereby be determined as the different in the vertical positions recorded, which is independent of the probe height.

Additional techniques in which measurements of a force applied to the build platform may be applied are to detect whether a build platform has been installed correctly. If a build platform is simply missing, the forces measured over time during motion of the Z axis will be different compared with when a build platform is installed due to the different weights. In addition, if the build platform is installed but is moving incorrectly (e.g. is sticking in its motion, producing spikes in the force measurements over time), this can also be identified through force measurements on the Z axis.

In some embodiments, a user initiating a print with a build platform that has material on its surface may be detected from force measurements due to the increased weight of the build platform. Such detection may be particularly beneficial when the container comprises a thin film because of the propensity of the film to be damaged by applied force and/or interaction with sharp edges. A stereolithographic device may provide feedback to a user in the above cases where an issue is detected that may cause the device to be damaged and/or for reduced quality of a print may be expected.

Figure 12:
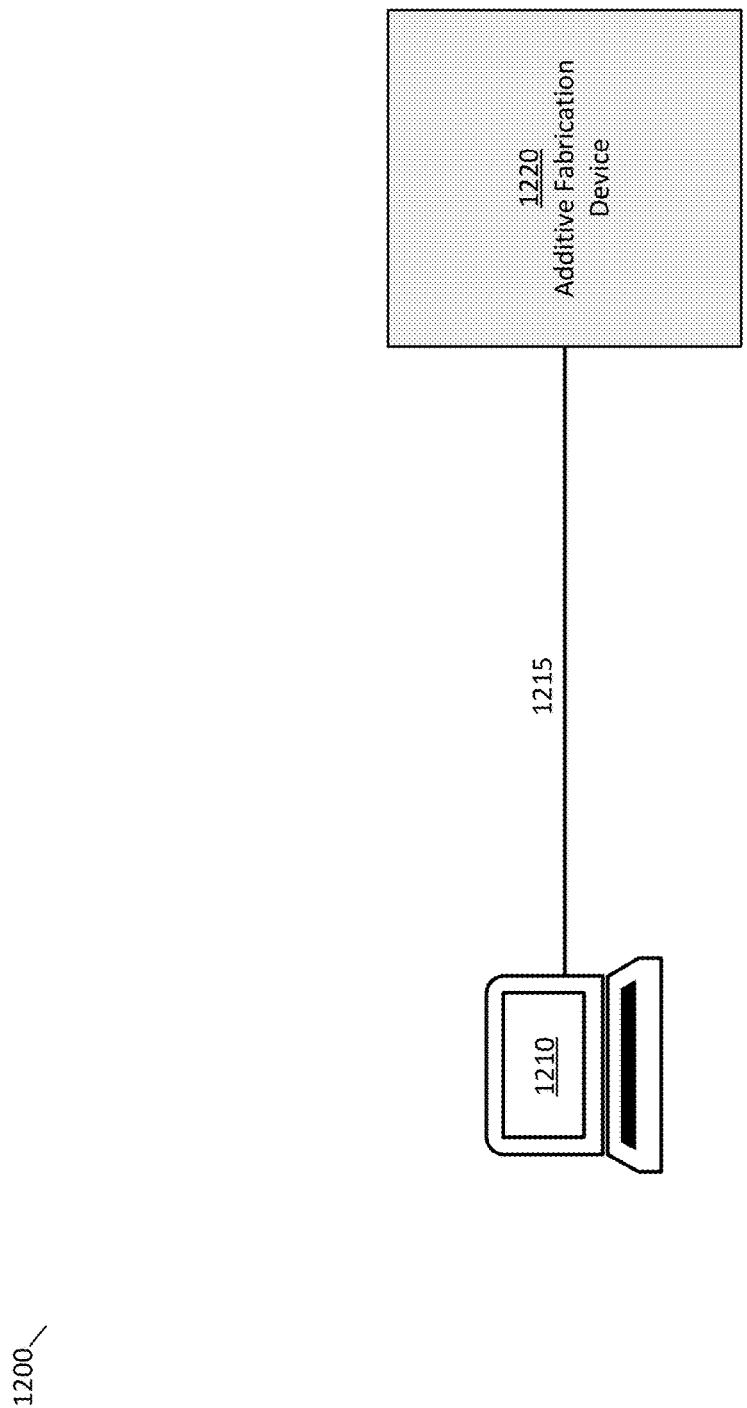
FIG. 12 is a block diagram of a system suitable for practicing aspects of the invention, according to some embodiments.

FIG. 12 is a block diagram of a system suitable for practicing aspects of the invention, according to some embodiments. While the above description relates primarily to a stereolithography device and its components, it will be appreciated that such a device may be programmed and/or otherwise controlled by a suitable computer system.

System 1200 illustrates a system suitable for generating instructions to control an additive fabrication device to perform operations as described above. For instance, instructions to operate one or more light sources (including turning the light source on and off as discussed in relation to FIG. 11), light directing components associated with such light sources (e.g., computer adjustable mirrors, such as mirror galvanometers), sensors, move an exposure source beneath a film surface, move a build platform, sense a position of the build platform, and/or adjust tension of a film system may be generated.

According to some embodiments, computer system 1210 may execute software that generates two-dimensional layers that may each comprise sections of the object. Instructions may then be generated from this layer data to be provided to an additive fabrication device, such as additive fabrication device 1220, that, when executed by the device, fabricates the layers and thereby fabricates the object. Such instructions may be communicated via link 1215, which may comprise any suitable wired and/or wireless communications connection. In some embodiments, a single housing holds the computing device 1210 and additive fabrication device 1220 such that the link 1215 is an internal link connecting two modules within the housing of system 1200.

Figure 15:
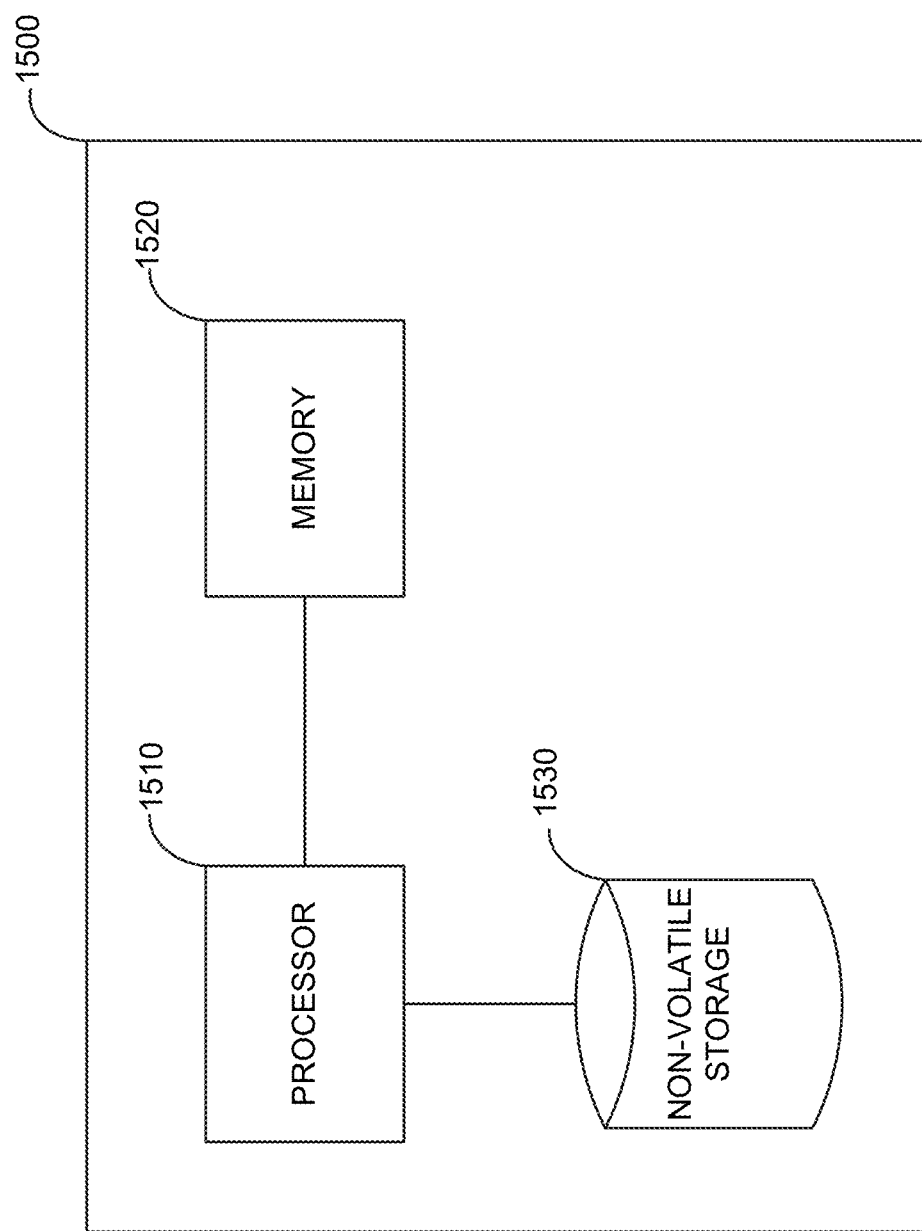
FIG. 15 illustrates an example of a computing system environment on which aspects of the present application may be implemented.

An illustrative implementation of a computer system 1500 that may be used to perform any of the techniques described above is shown in FIG. 15. The computer system 1500 may include one or more processors 1510 and one or more non-transitory computer-readable storage media (e.g., memory 1520 and one or more non-volatile storage media 1530). The processor 1510 may control writing data to and reading data from the memory 1520 and the non-volatile storage device 1530 in any suitable manner, as the aspects of the invention described herein are not limited in this respect. To perform functionality and/or techniques described herein, the processor 1510 may execute one or more instructions stored in one or more computer-readable storage media (e.g., the memory 1520, storage media, etc.), which may serve as non-transitory computer-readable storage media storing instructions for execution by the processor 1510.

In connection with techniques described herein, code used to, for example, generate instructions that, when executed, cause an additive fabrication device to operate one or more light sources (including turning the light source on and off as discussed in relation to FIG. 11), light directing components associated with such light sources (e.g., computer adjustable mirrors, such as mirror galvanometers), sensors, move an exposure source beneath a film surface, measure a force applied to a build platform, move a build platform, sense a position of the build platform, and/or adjust tension of a film system may be stored on one or more computer-readable storage media of computer system 1500. Processor 1510 may execute any such code to perform any of the above-described techniques as described herein. Any other software, programs or instructions described herein may also be stored and executed by computer system 1500. It will be appreciated that computer code may be applied to any aspects of methods and techniques described herein. For example, computer code may be applied to interact with an operating system to transmit instructions to an additive fabrication device through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this invention, it is to be appreciated that various alterations, modifications, and improvements will readily occur to those skilled in the art.

For instance, various modules within an additive fabrication device have been described with reference to a particular combination of modules with a particular additive fabrication technique (namely, stereolithography). It will be appreciated, however, that some of these modules may also be applied in other types of additive fabrication devices. For example, the exposure module 109 shown in FIGS. 1A-1D or exposure module 209 shown in FIG. 2A may be deployed in a Selective Laser Sintering (SLS) device to melt or otherwise consolidate material.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within 20% of one another in some embodiments, within 10% of one another in some embodiments, within 5% of one another in some embodiments, and yet within 2% of one another in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to form layers of solid material on a build platform, each layer of material being formed so as to contact a container in addition to the surface of the build platform and/or a previously formed layer of material, the additive fabrication device comprising:
   a container having an interior bottom surface extending in a first direction and a second direction, perpendicular to the first direction;
   a movable stage configured to move in the first direction, the movable stage being arranged beneath the container, the movable stage comprising:
   a light source;
   a parabolic mirror; and
   a positioning device configured to direct light from the light source onto any of a plurality of points on the parabolic mirror, thereby causing light to be output from the movable stage through the interior bottom surface of the container at any of a plurality of locations along the second direction; and
   at least one processor configured to operate the movable stage, the light source and the positioning device to cure selected regions of photopolymer within the container by moving the positioning device through a range of positions while the light source is active, and moving the movable stage while the light source is inactive between curing of at least some of the selected regions of the photopolymer.

2. The additive fabrication device of claim 1, wherein the at least one processor is configured to move the movable stage whilst directing the light from the light source, via the parabolic mirror, back and forth through the plurality of locations along the second direction, thereby scanning the light over a two-dimensional region of the interior bottom surface.

3. The additive fabrication device of claim 1, further comprising one or more optical elements.

4. The additive fabrication device of claim 3, wherein the one or more optical elements include an f-theta lens.

5. The additive fabrication device of claim 3, wherein the one or more optical elements include a mirror galvanometer.

6. The additive fabrication device of claim 5, wherein the at least one processor is configured to position the mirror galvanometer to direct the light from the light source through the interior bottom surface of the container at a desired one of the plurality of locations along the second direction.

7. The additive fabrication device of claim 6, wherein the mirror galvanometer is arranged to direct the light from the light source onto the parabolic mirror, and wherein the parabolic mirror is arranged to reflect light from the mirror galvanometer through the interior bottom surface of the container.

\* \* \* \* \*